US006468437B1

(12) United States Patent
Kashino et al.

(10) Patent No.: US 6,468,437 B1
(45) Date of Patent: Oct. 22, 2002

(54) METHOD FOR PRODUCING LIQUID DISCHARGING HEAD

(75) Inventors: Toshio Kashino, Chigasaki; Ichiro Saito, Yokohama; Yoshiyuki Imanaka, Kawasaki; Teruo Ozaki, Yokohama; Masahiko Kubota, Tokyo; Muga Mochizuki, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/452,182

(22) Filed: Dec. 2, 1999

(30) Foreign Application Priority Data

Dec. 3, 1998 (JP) .......................................... 10-344721
Dec. 3, 1998 (JP) .......................................... 10-344729

(51) Int. Cl.[7] ............................ B41J 2/04; G01D 15/16

(52) U.S. Cl. ............................ 216/27; 216/41; 438/21; 347/56; 347/65

(58) Field of Search ....................... 216/27, 41; 347/56, 347/65; 438/21

(56) References Cited

U.S. PATENT DOCUMENTS

| | | | | | |
|---|---|---|---|---|---|
| 4,723,129 A | | 2/1988 | Endo et al. | 346/1.1 |
| 5,637,517 A | * | 6/1997 | Choi | 438/29 |
| 5,660,739 A | | 8/1997 | Ozaki et al. | 216/27 |
| 5,838,351 A | | 11/1998 | Weber | 347/85 |
| 5,897,789 A | * | 4/1999 | Weber | 216/27 |
| 6,074,543 A | * | 6/2000 | Yoshihira et al. | 205/75 |
| 6,245,247 B1 | * | 6/2001 | Silverbrook | 216/27 |

FOREIGN PATENT DOCUMENTS

| | | | | |
|---|---|---|---|---|
| EP | 0665590 A | | 8/1995 | H01L/23/00 |
| EP | 0813967 A2 | | 12/1997 | B41J/2/14 |
| EP | 09200998 | | 6/1999 | B41J/2/05 |
| JP | 3-247451 | * | 11/1991 | B41J/2/015 |
| JP | 8-4892 | | 1/1996 | |
| JP | 9-201966 | | 8/1997 | |

* cited by examiner

*Primary Examiner*—Randy Gulakowski
*Assistant Examiner*—Shamim Ahmed
(74) *Attorney, Agent, or Firm*—Fitzpatrick, Cella, Harper & Scinto

(57) ABSTRACT

A method for producing a liquid discharge head provided with an element substrate and a ceiling plate which are fixed in a mutually opposed state, plural liquid path walls provided between said ceiling plate and said element substrate and defining plural liquid paths, plural discharge energy generating elements provided in parallel manner on the surface of said element substrate so as to be respectively positioned in said plural liquid paths, and plural movable members provided on said element substrate so as to respectively oppose said plural discharge energy generating elements and formed like a cantilever, fixed at the upstream ends in the flowing direction of the liquid in said liquid paths and having free ends at the downstream ends, the method comprising the steps of forming a gap forming member in a position, forming a first material layer, patterning an anti-etching protective film, forming a second material layer, removing a portion of said second material layer, cutting said element substrate, and removing said gap forming member.

20 Claims, 25 Drawing Sheets

Y
Y
522
502
501

524
522
502
501

1101
524
522
502
501

550
1101
524
502
501

550
1101
525
502
501

550
1101
525
502
501

550
1101
502
501

METHOD FOR PRODUCING LIQUID DISCHARGING HEAD

BACKGROUND OF THE INVENTION

1. Field of the Invention

The present invention relates to a method for producing a liquid discharging head adapted for use in a printer constituting an output terminal for a copying apparatus, a facsimile apparatus, a word processor or a host computer or in a video printer, and more particularly to a method for producing a liquid discharging head having a substrate on which formed is an electrothermal converting element for generating thermal energy to be used for recording. More specifically, it relates to a method for producing a liquid discharging head adapted for use in a liquid discharge recording apparatus which executes recording by discharging recording liquid (such as ink) as a flying droplet from a discharge opening (orifice) and depositing the liquid onto a recording medium.

2. Related Background Art

There is already known so-called bubble jet recording method, namely an ink jet recording method of providing ink with an energy such as heat to cause a state change involving an abrupt volumic change in the ink, discharging ink from the discharge opening by an action force based on such state change and depositing the ink onto a recording medium to form an image. The recording apparatus employing such bubble jet recording method is generally provided, as disclosed in the U.S. Pat. No. 4,723,129, with a discharge opening for discharging ink, an ink path communicating with the discharge opening and an electrothermal converting member provided in the ink path and serving as energy generating means for generating energy for discharging the ink.

Such recording method has various advantages for example of recording an image of high quality at a high speed with a low noise level, and recording an image of a high resolution or even a color image with a compact apparatus since, in the head executing such recording method, the ink discharge openings can be arranged with a high density. For this reason, the bubble jet recording method is recently employed in various office equipment such as printers, copying machines, facsimile apparatus etc., and even in industrial systems such as fabric dyeing apparatus.

With the spreading of the bubble jet technology into various fields, there are appearing various demands explained in the following.

For example, in order to satisfy a demand for improving the energy efficiency, there is conceived optimization of the heat generating member, such as adjustment of the thickness of the protective film for the heat generating member. This method is effective in improving the efficiency of propagation of the generated heat to the liquid.

Also for obtaining the image of high quality, there is proposed a driving method for liquid discharge capable of realizing a faster ink discharging speed and satisfactory ink discharge based on stable bubble generation, and, for achieving high-speed recording, there is proposed an improved shape of the liquid path for realizing the liquid discharge head with a faster refilling speed of the liquid into the liquid path.

Also in relation to the basic principle of liquid discharge, investigations have been made to provide a novel liquid discharging method utilizing the bubble that has not been available and a head adapted for use in such method, and such method and head are disclosed for example in the Japanese Patent Application Laid-open No. 9-201966.

In the following there will be explained, with reference to FIGS. 21A to 21D and 22, the conventional liquid discharging method and the head therefor disclosed in the Japanese Patent Application Laid-open No. 9-201966. FIGS. 21A to 21D are cross-sectional views along the liquid path, for explaining the discharging principle of the conventional liquid discharge head, and FIG. 22 is a partially broken perspective view of the liquid discharge head shown in FIGS. 21A to 21D. The liquid discharge head shown in FIGS. 21A to 21D and 22 has a basic configuration of controlling the pressure propagating direction based on the bubble and the growing direction thereof, thereby improving the discharging force and the discharging efficiency.

In the following description, the expression “upstream” or “downstream” refers to the liquid flowing direction from the liquid supply source, then through above a bubble generating area, toward the discharge opening.

The “downstream side” relating to the bubble itself refers to the side of discharge opening of the bubble, considered principally acting on the discharge of the liquid droplet. More specifically, it means the downstream side in the flowing direction mentioned above or the direction in the above-described configuration with respect to the center of the bubble, or means a bubble generated in an area of the heat generating member in the downstream side with respect to the areal center thereof.

Also the “comb-tooth shape” means a shape in which movable members are as a common member at the fulcrum ends thereof and are liberated in front of the free ends thereof.

In the configuration shown in FIGS. 21A to 21D, the liquid discharge head is provided, on an element substrate 1101, with a heat generating member 1102 as a discharge energy generating element for giving thermal energy to the liquid for the discharge thereof, and a liquid path 1103 is provided on the element substrate 1101, corresponding to the heat generating member 1102. The liquid path 1103 communicates with a discharge opening 1104 and also with a common liquid chamber 1105 for supplying plural liquid paths 1103 with the liquid, and receives, from the common liquid chamber 1105, with the liquid of an amount matching the discharged amount thereof.

On the element substrate 1101 in the liquid path 1103, a plate-shaped movable member 1106, composed of an elastic material such as metal and having a flat portion, is formed in the form of a beam supported at an end, so as to face the aforementioned heat generating member 1102. An end of the movable member 1106 is fixed to a support member 1107 formed by patterning photosensitive resin or the like on the wall of the liquid path 1103 or on the element substrate 1101, whereby the movable member 1106 is supported by the support member 1107 with a fulcrum 1108.

The movable members 1106 are constructed in a comb-tooth shape, whereby the movable member 1106 can be prepared easily and inexpensively, and can be easily aligned with the support member 1107.

The movable member 1106 is so positioned as to be opposed to and to cover the heat generating member 1102, with a distance of about 15 μm therefrom, and to have the fulcrum 1108 at the upstream side in the main flowing direction of the liquid, caused by the liquid discharging operation, from the common liquid chamber 1105 through above the movable member 1106 toward the discharge opening 1104 and to have the free end 1109 at the downstream side with respect to the fulcrum 1108. A space between the heat generating member 1102 and the movable member 1106 constitutes a bubble generating area 1110.

Heat generation by the heat generating member 1102 applies heat to the liquid in the bubble generating area 1110 between the movable member 1106 and the heat generating member 1102, thereby generating a bubble in the liquid based on a film boiling phenomenon as described in the U.S. Pat. No. 4,723,129 (see. FIG. 21B). The bubble 111 and the pressure resulting from the generation thereof are preferentially applied to the movable member 1106, which in response displaces to open widely toward the discharge opening 1104 about the fulcrum 1108, as shown in FIGS. 21B and 21C or in FIG. 22. Based on the displacement of the movable member 1106 or the displaced state thereof, and also on a fact that the front end portion of the bubble has a certain width, the pressure resulting from the generation of the bubble 1111 can more easily propagate toward the discharge opening 1104, whereby a basic improvement can be attained in the discharging efficient of the liquid droplet 1133, discharging force thereof or discharging speed thereof. A reference number 1130 indicates the areal center of the heat generating member.

As explained in the foregoing, the technology disclosed in the Japanese Patent Application Laid-open No. 8-4892 is to positively control the bubble by positioning the fulcrum and the free end of the movable member in the liquid path in such a manner that the free end is provided at the side of the discharge opening or at the downstream side, and by positioning the movable member so as to be opposed to the heat generating member or the bubble generating area.

Also a liquid discharge head shown in FIG. 23 has an element substrate 1201, a heat generating member 1202, a liquid path 1203, a discharge opening 1204, a common liquid chamber 1205 and a bubble generating area 1209 which are similarly constructed as those shown in FIGS. 21A to 21D and which will not, therefore, be explained further.

In the liquid discharge head shown in FIG. 23, the movable member 1206 formed as a beam supported at an end is provided, at an end thereof, with a step difference portion 1206*a*, and is directly fixed to the element substrate 1201. Thus the movable member 1206 is supported on the element substrate 1201 with a fulcrum 1207 and has a free end 1208 at the downstream side of the fulcrum 1207.

A gap of about 1 to 20 $\mu$m is formed between the movable member and the heat generating member by forming a support member in the fixing portion of the movable member or forming a step difference in the fixing portion of the movable member as explained in the foregoing, thereby achieving a sufficient improvement in the liquid discharging efficiency by the movable member. Thus, in the liquid discharge head based on the above-described novel principle of liquid discharge, there can be attained a multiplying effect of the generated bubble and the movable member displaced thereby, thus achieving efficient discharge of the liquid present in the vicinity of the discharge opening, thereby improving the liquid discharging efficiency in comparison with the discharging method or head of the conventional bubble jet system.

The present invention is to improve the fundamental discharge characteristics of the basically conventionally method of discharging liquid by forming a bubble, particularly a bubble based on film boiling, in the liquid path, to a level that cannot be anticipated before.

The present inventors have made intensive investigations in order to provide a novel liquid droplet discharging method utilizing the conventionally unavailable bubble and a head utilizing such method. In these investigations, there have been executed first technical analysis on the function of the movable member in the liquid path, analyzing the principle of the mechanism of the movable member in the liquid path, a second technical analysis on the principle of liquid droplet discharge by the bubble, and third technical analysis on the bubble forming area of the heat generating member for bubble formation, and, through these analyses, there has been established a completely novel technology of positively controlling the bubble by positioning the fulcrum and the free end of the movable member in such a manner that the free end is provided at the side of the discharge opening or at the downstream side and by positioning the movable member so as to be opposed to the heat generating member or the bubble generating area.

Then, in consideration of the effect of the energy of the bubble itself on the discharge amount, there is obtained knowledge that the growing component in the downstream side of the bubble is the largest factor capable of drastically improving the discharge characteristics. More specifically, it has been found that the efficient conversion of the growing component in the downstream side of the bubble toward the discharging direction leads to an improvement in the discharge efficiency and discharge speed.

It has further been found that structural consideration is desirable on the movable or the liquid path relating to the heat generating area serving to form the bubble, for example relating to the bubble growth in the downstream side with respect to the central line passing through the areal center of the electrothermal converting member in the liquid flowing direction, or in the downstream side of the bubble with respect to the areal center of the area contributing to the bubble generation.

It has further been found that the refilling speed can be significantly improved by giving consideration to the arrangement of the movable member and the structure of the liquid supply path.

Also there has been found a difficulty in cutting the element substrate bearing the movable members from a wafer with a dicing saw, that the production yield is lowered by breaking of the movable member by the pressure of water at the cutting operation or by the air pressure generated by the high-speed rotation of the diamond blade, since a gap of about 1 to 20 $\mu$m is present between the movable member and the heat generating member.

SUMMARY OF THE INVENTION

An object of the present invention is to provide a liquid discharge head capable, at least at the cutting of the element substrate bearing the movable member, of preventing breakage or deformation of the movable member by the pressure of grinding water or by the air pressure generating by the high-speed rotation of the dicing blade, thereby enable stable manufacture with a high production yield. Another object of the present invention is to provide a liquid discharge head and a liquid discharge apparatus of high reliability with stable discharging characteristics, in liquid discharge utilizing the displacement of the free end of the movable member. Still another object of the present invention is to provide a method for producing the liquid discharge head, capable of forming the movable member etc. thereof with a high precision and a high density.

Still another object of the present invention is to provide a method for producing the liquid discharge head, capable of improving the yield safely without complicating the process, in case the method includes a step of cutting the element substrate bearing the movable member from a wafer by dicing operation.

The above-mentioned objects can be attained, according to the producing method of the present invention, by a liquid discharge head comprising a discharge opening for discharging liquid, a liquid path communicating with the discharge opening for supplying the discharge opening with the liquid, a substrate provided with a heat generating member for generating a bubble in the liquid filled in the liquid path, and a movable member supported by the substrate in a position opposed to the heat generating member on the substrate, with a gap to the substrate and with the free end at the side of the discharge opening, wherein the free end of the movable member is displaced, by the pressure generated by the generation of the bubble, toward the discharge opening about a fulcrum portion present in the vicinity of the supporting portion for the movable member on the substrate, thereby discharging the liquid from the discharge opening.

Further, in order to attain the above-mentioned object, a method for producing a liquid discharge head provided with an element substrate and a ceiling plate which are fixed in a mutually opposed state, plural liquid path walls provided between the ceiling plate and the element substrate and defining plural liquid paths, plural discharge energy generating elements provided in parallel manner on the surface of the element substrate so as to be respectively positioned in the plural liquid paths, and plural movable members provided on the element substrate so as to respectively oppose to the plural discharge energy generating elements and formed like a cantilever, fixed at the upstream ends in the flowing direction of the liquid in the liquid paths and having free ends at the downstream ends, comprises following steps of:

forming a gap forming member in a position, on the surface provided with the discharge energy generating element of the element substrate, corresponding to a bubble generating area where a bubble is generated in the liquid by the thermal energy generated by the discharge energy generating element;

forming a first material layer to constitute the movable member on the gap forming member;

patterning an anti-etching protective film in the form of the movable member;

forming a second material layer to constitute the liquid path walls so as to cover the upper and lateral faces of the patterned anti-etching protective film;

removing a portion corresponding to the liquid path in the second material layer by etching, thereby forming the liquid path walls and the liquid path;

cutting the element substrate to be plurally separated between the step of patterning the movable member and the step of forming the second material layer; and removing the gap forming member after the formation of the liquid path.

In order to attain the object mentioned above, a method for producing a liquid discharge head provided with an element substrate and a ceiling plate which are fixed in a mutually opposed state, plural liquid path walls provided between the ceiling plate and the element substrate and defining plural liquid paths, plural discharge energy generating elements provided in parallel manner on the surface of the element substrate so as to be respectively positioned in the plural liquid paths, and plural movable members provided on the element substrate so as to respectively oppose to the plural discharge energy generating elements and formed like a cantilever, fixed at the upstream ends in the flowing direction of the liquid in the liquid paths and having free ends at the downstream ends, comprises steps of:

forming a gap forming member in a position, on the surface provided with the discharge energy generating element of the element substrate, corresponding to a bubble generating area where a bubble is generated in the liquid by the thermal energy generated by the discharge energy generating element;

forming a first material layer to constitute the movable member on the gap forming member;

forming an anti-etching protective film in the form of the movable member on the first material layer;

patterning the first material layer thereby forming the movable member;

forming a second material layer to constitute the liquid path walls so as to cover the upper and lateral faces of the patterned anti-etching protective film;

removing a portion corresponding to the liquid path in the second material layer by etching, thereby forming the liquid path walls and the liquid path;

removing the gap forming member after the formation of the liquid path; and cutting the element substrate to be plurally separated between the step of forming the movable member and the step of removing the gap forming member.

In order to attain the object, a method for producing a liquid discharge head at least includes:

a discharge opening for discharging liquid;

a liquid path communicating with the discharge opening for supply of the liquid thereto;

a substrate provided with a heat generating member for generating a bubble in the liquid filled in the liquid path; and a movable member supported by and fixed to the substrate in a position opposed to the heat generating member on the substrate with a gap from the substrate and with a free end at the side of the discharge opening;

wherein the free end of the movable member is displaced toward the discharge opening about a fulcrum portion formed in the vicinity of the fixing portion of the movable member on the substrate by the pressure induced by the generation of the bubble, whereby the liquid is discharged from the discharge opening, the method comprising steps of:

forming a gap forming member on the substrate for forming the gap;

forming the movable member on the gap forming member;

cutting the substrate to be plurally separated; and removing the gap forming member.

Further, to attain the above object, a method for producing a liquid discharge head includes:

a discharge opening for discharging liquid;

a liquid path communicating with the discharge opening for supply of the liquid thereto;

a substrate provided with a heat generating member for generating a bubble in the liquid filled in the liquid path; and a movable member supported by and fixed to the substrate in a position opposed to the heat generating member on the substrate with a gap from the substrate and with a free end at the side of the discharge opening;

wherein the free end of the movable member is displaced toward the discharge opening about a fulcrum portion formed in the vicinity of the fixing portion of the movable member on the substrate by the pressure induced by the generation of the bubble, whereby the liquid is discharged from the discharge opening, the method comprising steps of:

forming a protective layer on the substrate in order to form a plurality of the substrates on a single wafer;

forming a gap forming member on the substrate and on the protective layer for forming the gap;

forming a base material for the movable member on the substrate, the protective layer and the gap forming member;

patterning the base material for the movable member thereby forming the movable member;

removing the protective layer;

filling a gap filling material in the gap;

cutting and separating each substrate from the wafer; and removing the gap forming member by washing.

Furthermore, to attain the above object, a method for producing a liquid discharge head includes:

a discharge opening for discharging liquid;

a liquid path communicating with the discharge opening for supply of the liquid thereto;

a substrate provided with a heat generating member for generating a bubble in the liquid filled in the liquid path; and a movable member supported by and fixed to the substrate in a position opposed to the heat generating member on the substrate with a gap from the substrate and with a free end at the side of the discharge opening;

wherein the free end of the movable member is displaced toward the discharge opening about a fulcrum portion formed in the vicinity of the fixing portion of the movable member on the substrate by the pressure induced by the generation of the bubble, whereby the liquid is discharged from the discharge opening, the method comprising steps of:

forming a protective layer on the substrate in order to form a plurality of the substrates on a single wafer;

separating each substrate by cutting from the wafer in a state in which a gap filler is filled in the gap between the movable member and the substrate; and removing the gap filler by washing after the step of separation by cutting.

The method for producing such liquid discharge head forms the movable member and the walls of the liquid path directly on the element substrate, utilizing the general manufacturing steps for the semiconductor device such as photolithography and etching, whereby these components can be formed with a high precision and with a high density. Also, in comparison with the case of separately preparing and thereafter assembling these components, there can be dispensed with the assembling step so that the manufacturing process can be simplified. Furthermore, as the movable member need not be adhered with an adhesive material, there can be avoided the contamination of the liquid inside the liquid path or the bubble generating area by such adhesive material.

Also in the step of forming the walls of the liquid path, an orifice plate having plural discharge openings respectively communicating with plural liquid paths may be formed in a position at the front end face of the walls of such plural liquid paths, simultaneously with the formation of the walls of the plural liquid paths on the element substrate. This method directly forms the orifice plate on the element substrate, thereby dispensing with the step of adhering the orifice plate and further simplifying the producing method for the liquid discharge head.

It is preferable, in a step of patterning an anti-etching protective film, to pattern a first material layer constituting the movable member, simultaneously an anti-etching protective film.

It is preferable to form the movable member, the walls of the plural liquid paths and the orifice plate with silicon nitride, a gap forming member with phosphor silicate glass (PSG) and an anti-etching protective film with aluminum.

A same material is preferably contained in the element substrate, movable member, walls of the liquid path, orifice plate and ceiling plate. In this manner, in case the temperature of the liquid discharge head is elevated by the thermal energy generated by the energy generating elements, it is rendered possible to suppress the stress resulting from the difference in the linear expansion coefficients of the members constituting the liquid discharge head. Consequently the mechanical characteristics of the liquid discharge head are improved, thereby improving the liquid discharge characteristics. More specifically it is preferred to constructing the element substrate by forming plural energy generating elements on a silicon substrate and forming the movable member, walls of the liquid path, orifice plate and ceiling plate with silicon nitride.

It is furthermore preferred to include a step of forming plural heater drivers for respectively driving the energy generating elements, respectively corresponding to the plural energy generating elements and in a linear array parallel to the arranged direction of the energy generating elements. In this manner the wirings can be arranged in an efficient layout on the surface of the element substrate, and the element substrate can be made compacter in chip size. More specifically, the heater driver can be composed of a transistor of offset MOS type, LDMOS type or LVMOS type with a voltage endurance of 10 to 50 V, in order to reduce the pitch of the heater drivers. Also the energy generating element can be composed of TaSiN having a sheet resistance of 50 Ω/□ or higher, thereby enabling to drive the energy generating elements with a pitch of several micrometers.

In the above-described producing method, in separating each heater substrate by dicing operation after plural heater substrates bearing the movable members are formed on a single wafer, there is included a coating step for a gap filling material for filling the gap between the heater substrate and the movable member prior to the cutting operation, in order to protect the movable member from the pressure of the grinding water or the air pressure generated by the high-speed rotation of the diamond blade, thereby resolving the drawback of loss of the production yield resulting from the breakage of the movable member.

DETAILED DESCRIPTION OF THE PREFERRED EMBODIMENTS

First Embodiment

Now the present invention will be explained in detail by an embodiment thereof, with reference to the attached drawings.

Figure 1:
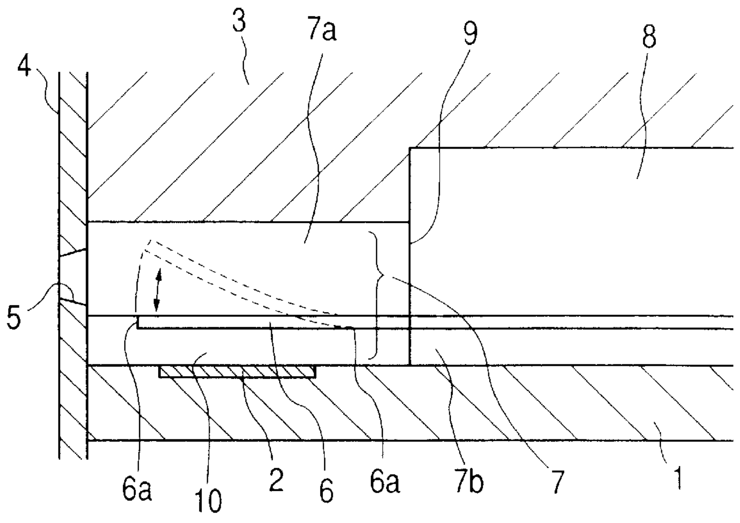
FIG. 1 is a cross-sectional view, along the direction of liquid path, showing the basic configuration of the liquid discharge head produced by a first embodiment of the present invention.

FIG. 1 is a cross-sectional view, in a direction along the liquid path, showing the basic configuration of the liquid discharge head constituting a first embodiment of the present invention. As shown in FIG. 1, the liquid discharge head of the present embodiment is provided with an element substrate 1 on which plural heat generating members 2 (only one being illustrated) are formed in parallel manner as the discharge energy generating elements for generating thermal energy for generating a bubble in the liquid, a ceiling plate 3 adhered onto the element substrate 1, and an orifice plate adhered to the front end face of the element substrate 1 and the ceiling plate 3.

The element substrate 1 is formed by a silicon oxide film or a silicon nitride film for electrical insulation and heat accumulation on a substrate such as of silicon and patterning thereon an electrical resistance layer constituting the heat generating member 2 and wirings therefor. The wirings serve to apply a voltage to the electrical resistance layer to induce a current therein, thereby generating heat in the heat generating member 2. On the wirings and the electrical resistance layer, there is formed a protective film for protection from the ink, and an anticavitation film is formed thereon for protection from the cavitation resulting from the vanishing of the ink bubble.

The ceiling plate 3 serves to form plural liquid paths respectively corresponding to the heat generating members 2 and a common liquid chamber 8 for supplying the liquid paths 7 with the liquid, and is integrally provided with liquid path lateral walls 9 extending from the ceiling to the gaps between the heat generating members 2. The ceiling plate 3 is composed of a silicon-containing material, and the liquid paths 7 and the common liquid chamber 8 are formed by pattern etching of a silicon substrate or by depositing silicon nitride or silicon oxide constituting the lateral walls 9 onto the silicon substrate by a known film forming method such as CVD and then etching the portions of the liquid paths 7.

In the orifice plate 4, there are formed plural discharge openings respectively corresponding to the liquid paths 7 and communicating with the common liquid chamber 8 through the liquid paths 7. The orifice plate 4 is also composed of a silicon-based material, and is formed for example by scraping a silicon substrate, on which the discharge openings (ports) 5 are formed, into a thickness of 10 to 150 $\mu$m. The orifice plate 4 is however not the essential component in the present invention, and may be replaced by the ceiling plate 3 with the discharge openings, formed by retaining a wall of a thickness corresponding to that of the orifice plate 4 at the front end face of the ceiling plate 3 at the formation of the liquid paths 7 thereon and forming the discharge openings 5 in thus retained wall portion.

In addition, the liquid discharge head is provided with a movable member 6 in the form of a cantilever, so positioned as to be opposed to the heat generating member 2 and as to divide the liquid path 7 into a first liquid path 7*a* communicating with the discharge opening 5 and a second liquid path 7*b* including the heat generating member 2. The movable member 6 is composed of a thin film of a silicon-containing material such as silicon nitride or silicon oxide.

The movable member 6 is so positioned as to be opposed to and to cover the heat generating member 2, with a predetermined distance therefrom, in such a manner as to have a fulcrum 6*a* at the upstream side in the direction of main liquid flow generated by the liquid discharging operation from the common liquid chamber 8 through the movable member 6 toward the discharge opening 5 and to have a free end 6*b* at the downstream side with respect to the fulcrum 6*a*. The space between the heat generating member 2 and the movable member 6 constitutes a bubble generating area 10.

When the heat generating member 2 generates heat in the above-described configuration, heat is applied to the liquid in the bubble generating area 10 between the movable member 6 and the heat generating member 2, whereby a bubble is generated and grows on the heat generating member 2, based on the film boiling phenomenon. The pressure resulting from the growth of the bubble preferentially acts on the movable member 6, whereby the movable member 6 displaces so as to open widely toward the discharge opening 5 about the fulcrum 6*a*, as indicated by a broken line in FIG. 1. The displacement of the movable member 6 or the displaced state thereof guides the pressure based on bubble generation and the growth of the bubble itself toward the discharge opening 5, whereby the liquid is discharged therefrom.

Thus, by positioning the movable member 6 on the bubble generating area 10, with the fulcrum 6*a* at the upstream side (side of common liquid chamber 8) of the liquid flow in the liquid path 7 and with the free end 6*b* at the downstream side (side of discharge opening 5), the propagation of the bubble pressure is guided toward the downstream side whereby the bubble pressure directly and efficiently contributes to the liquid discharge. Also the growing direction itself of the bubble is guided toward the downstream direction, like the direction of pressure propagation, whereby the bubble grows larger in the downstream side than in the upstream side. Such control of the growing direction itself of the bubble and the propagating direction of the bubble pressure by the movable member allows to improve the fundamental discharging characteristics of the discharge efficiency, discharge force or discharge speed.

On the other hand, when the bubble enters a vanishing stage, the bubble shrinks rapidly by the multiplying effect with the elastic force of the movable member 6, whereby it eventually returns to the solid-lined initial position shown in FIG. 1. In order to compensate the volumic shrinkage of the bubble in the bubble generating area 10 and the volume of the discharged liquid, the liquid flows in from the common liquid chamber 8 to achieve liquid refilling into the liquid path 7, and such liquid refilling is achieved efficiently, reasonably and stably in cooperation with the returning operation of the movable member 6.

As explained in the foregoing, in such liquid discharge head of the present embodiment, the element substrate 1 is arranged by a silicon substrate, while the ceiling plate 3, liquid path lateral walls 9, orifice plate 4 and movable member 6 are composed of silicon-based materials, so that silicon is contained in these components. Consequently, there can be suppressed the stress generated from the difference in the linear expansion coefficients of these components. It is therefore made possible to improve the mechanical characteristics of the liquid discharge head, thereby stabilizing the discharge characteristics and realizing the liquid discharge head of high reliability.

Figure 2:
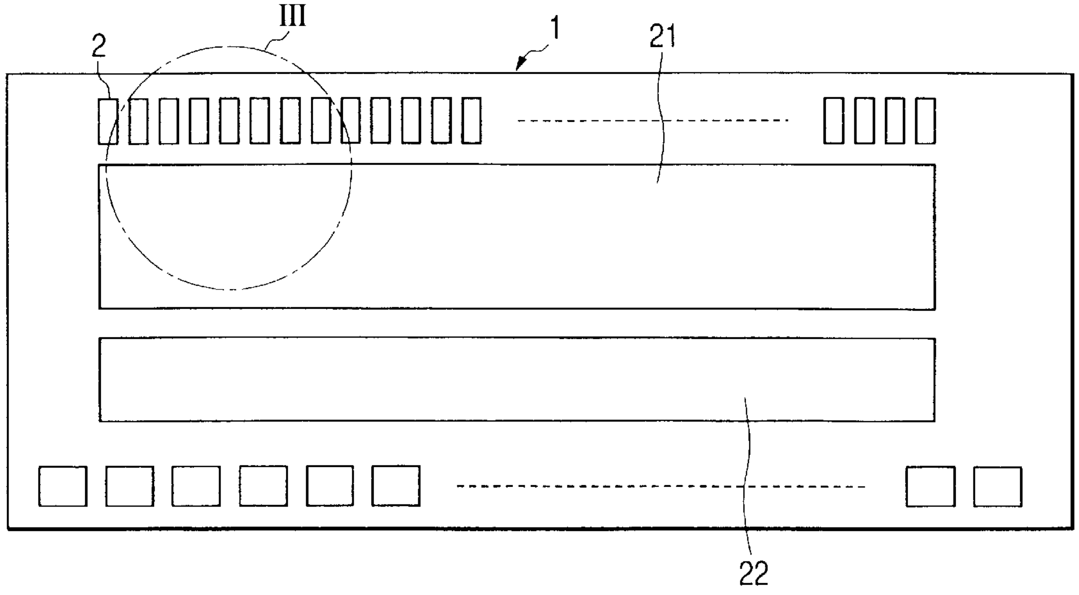
FIG. 2 is a plan view showing an element substrate of the liquid discharge head shown in FIG. 1.
Figure 3:
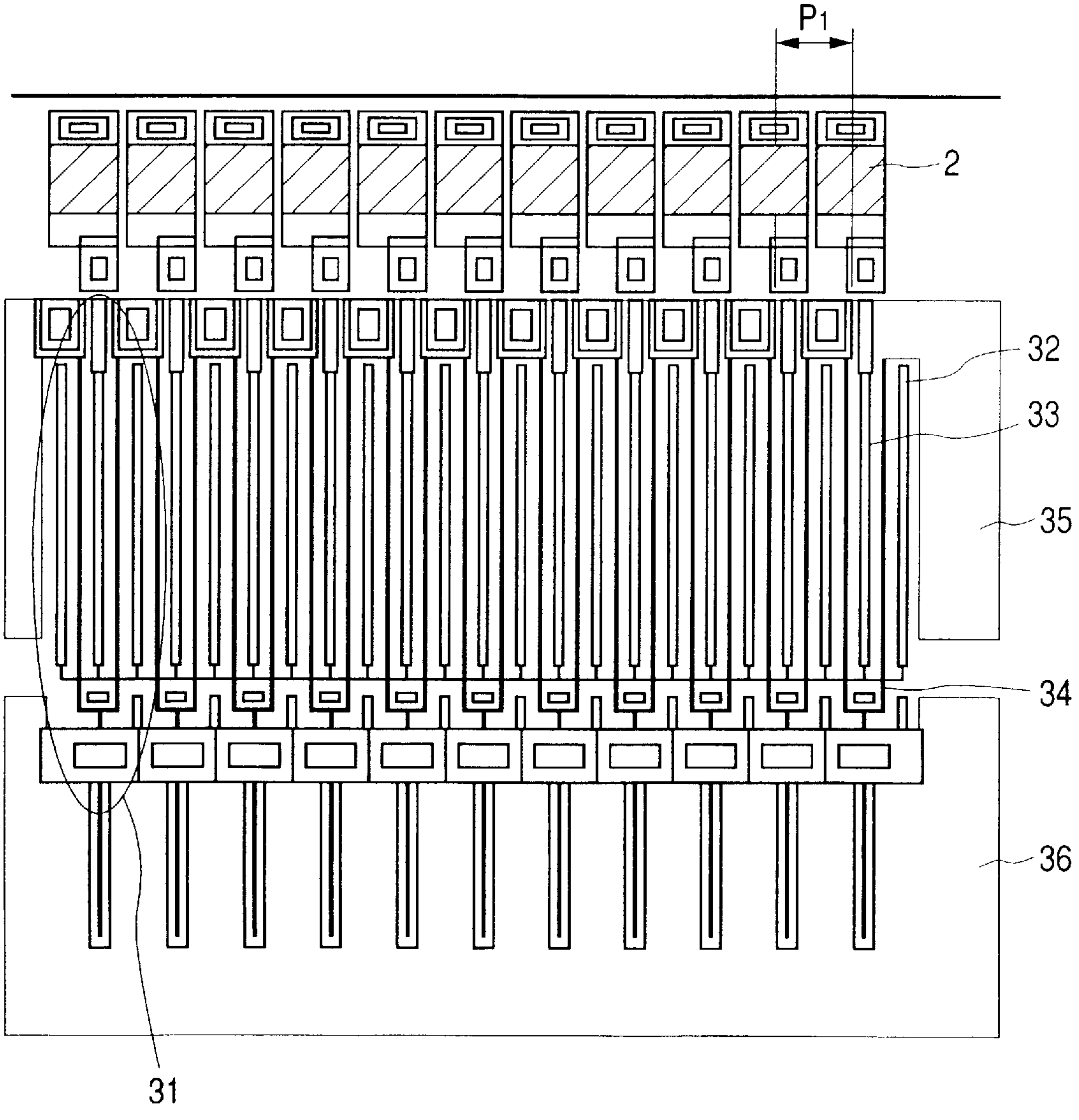
FIG. 3 is a magnified view of a portion III in FIG. 2.

FIG. 2 is a plan view of the element substrate 1 shown in FIG. 1. On a face of the element substrate 1, at the side of the ceiling plate 3, plural heat generating members 2 are arranged in parallel along an edge of the element substrate 1 as shown in FIG. 2. On the above-mentioned face of the element substrate 1, the central portion constitutes a heater driver forming area 21, in which plural heater drivers 31 (see. FIG. 3) are arrayed in a direction same as the array direction of the plural heat generating members 2. Also in a portion of the heater driver forming area 21, opposite to the heat generating members 2, there is formed a shift register latch 22.

FIG. 3 is a magnified view of a portion III in FIG. 2. The element substrate 1 of the present embodiment employs heaters arranged with a high density, providing a resolution of 600 dpi (dot per inch) or higher in the recorded image. In consideration of the arrangement of wirings on the element substrate 1, the heater drivers 31 for driving the heat generating members 2 are arranged in a linear array. In the heater driver forming area 21 shown in FIG. 2, the heater drivers 31 are formed in a direction parallel to that of the heat generating members 2 as shown in FIG. 3. The pitch P1 of the heater drivers 31 is same as the pitch of the heat generating members 2, and is selected in a range of 15 to 42 μm.

The heater driver 31 is composed of a source 32 extending in a direction perpendicular to the direction of array of the heater drivers 31, a drain 33 and a gate 34 parallel to the source 32, and the drain 33 is electrically connected to the heat generating member 2. In the heater driver forming area 21, there are formed a heater driving power source 35 and a ground 36 composed of a metal layer.

The heater driver 31 is required to have a high voltage endurance (about 10 to 50 V) and to be of a very narrow width in order to be positioned with a pitch of 15 to 42 μm as explained above. The heater driver 31 satisfying such requirements can be composed of a transistor of offset MOS type, LDMOS type or VDMOS type.

Figure 4:
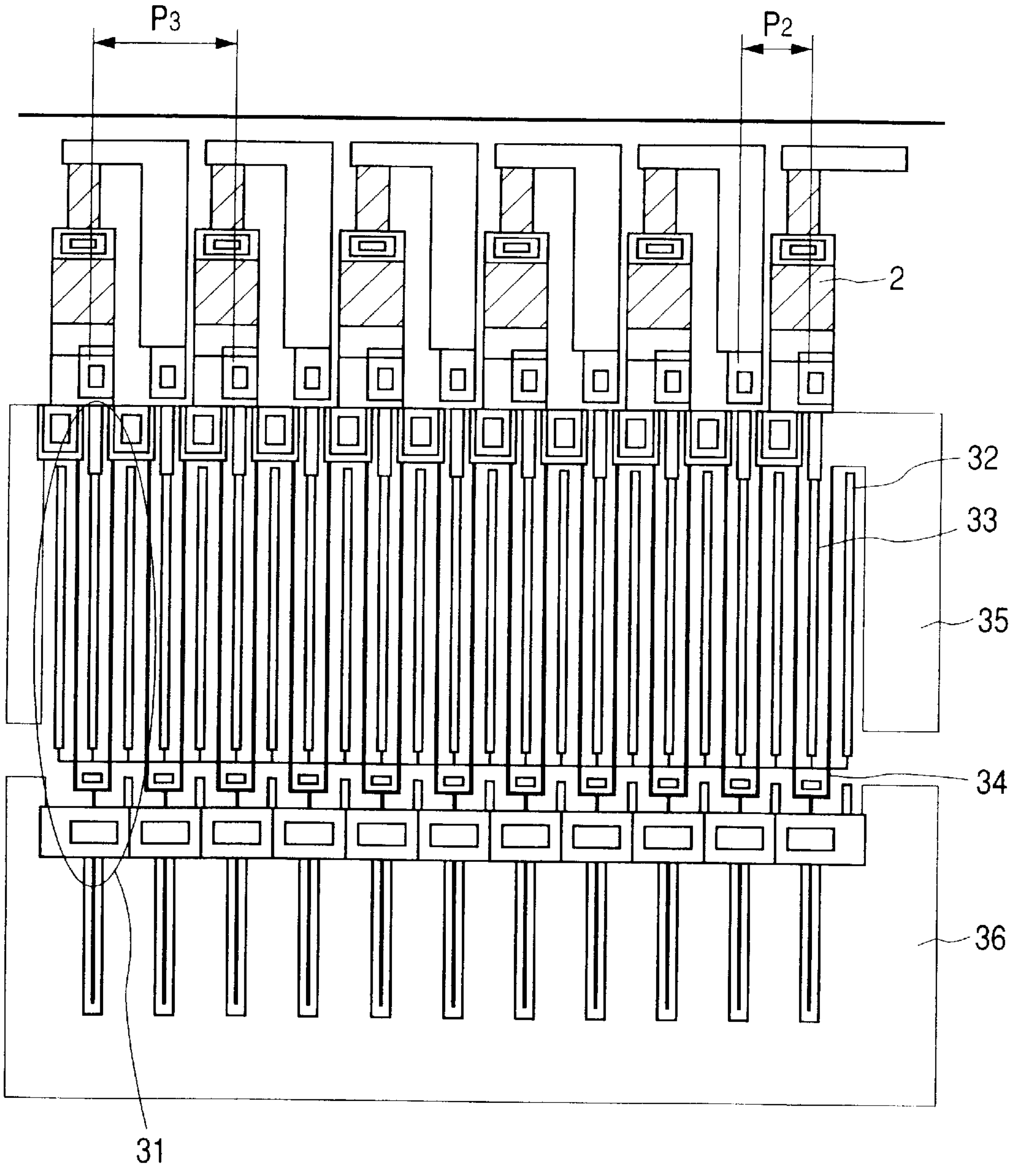
FIG. 4 is a magnified view showing another example of the element substrate of the liquid discharge head shown in FIG. 1.

FIG. 4 is a magnified view showing a second example of the element substrate 1 shown in FIG. 1. In contrast to the configuration shown in FIG. 3 in which the pitch of the heater drivers 31 is same as that of the heat generating members 2, in the configuration shown in FIG. 4, the pitch P3 of the heat generating members 2 is twice of the pitch P2 of the heater drivers 31. With such element substrate 1, plural heat generating members 2 are positioned for each nozzle and are driven for a single nozzle thereby achieving tonal recording.

In the following there will be explained an example employing the element substrate 1 of the configuration shown in FIG. 3 or 4, wherein the heat generating members 2 are so arranged as to attain a resolution of 1200 dpi on the record image. In such case, the voltage of the power source for driving the heat generating member 2 is preferably as high as possible, in consideration of fluctuation in the resistance of wirings, in the power source itself or in the heater drivers 31. In the present embodiment, the voltage of the power source is selected as 24 V. The pitch of the heat generating members 2 is about 21 μm, and the width thereof is selected as 14 μm including a margin. The length of the heat generating member 2 is selected as 60 μm, in order to secure the area thereof required for attaining the recording density of 1200 dpi. In order to drive the heat generating member 2 with an interval of several microseconds, the resistance of the heat generating member 2 has to be made high, and the sheet resistance thereof is required to be 50 Ω/□.

Therefore, the resistance of the heat generating member 2 for 1200 dpi is selected as 200 Ω or higher, by selecting TaSiN as the material therefor. The heater driver 31 is composed of a transistor of LDMOS type which can be formed relatively small in the width. An image of 1200 dpi can be recorded by driving the liquid discharge head of such configuration.

In the liquid discharge head with the heat generating members 2 arranged with a high density as explained above, the heater driver 31 can be composed of a transistor of offset MOS type, LDMOS type or VDMOS type, whereby the heater drivers can be arranged in a linear array of a high density on the element substrate 1 and the wirings can be arranged in an efficient layout on the element substrate 1. As a result, the element substrate 1 can be formed compact in the chip size.

Also there can be realized the liquid discharge head with limited fluctuation in the voltage applied to the heat generating members, by the combination of the heat generating members 2 having a sheet resistance as high as 50 Ω/□ or even higher and the heater driver 31 of the above-mentioned MOS structure capable of withstanding a voltage of 10 V or even higher.

In the following there will be explained the method for producing the liquid discharge head of the present embodiment. FIGS. 5A to 5J and 6A to 6H illustrate the producing method for the liquid discharge head explained with reference to FIG. 1. FIGS. 5A to 5E and 6A to 6D are cross-sectional views along a direction perpendicular to the extending direction of the liquid paths, and FIGS. 5F to 5J and 6E to 6H are corresponding cross-sectional views in the direction along the liquid paths. The liquid discharge head of the present embodiment is prepared through steps shown in FIGS. 5A to 5E and 6A to 6D, and those shown in FIGS. 5F to 5J and 6E to 6H. A broken line in these drawings indicates a position where cutting is to be made.

Figure 5A:
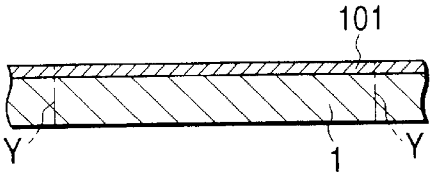
FIGS. 5A, 5B, 5C, 5D, 5E, 5F, 5G, 5H, 5I and 5J are views showing steps in a former part of the first embodiment of the producing method of the present invention for the liquid discharge head.
Figure 5B:
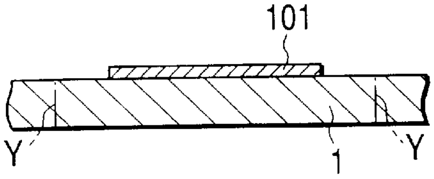
Figure 5C:
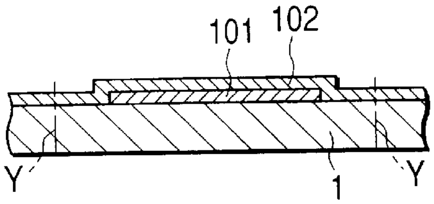
Figure 5D:
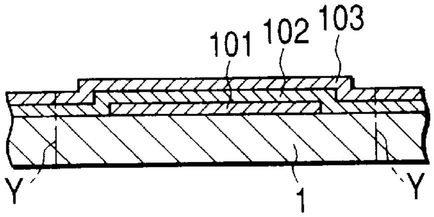
Figure 5E:
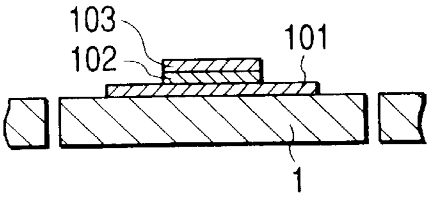
Figure 5F:
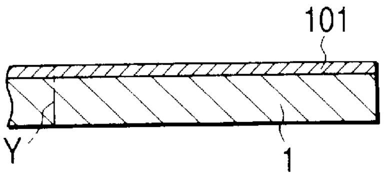

At first, as shown in FIGS. 5A and 5F, on the entire face of the element substrate 1 at the side of the heat generating members 2, a PSG (phosphosilicate glass) film 101 is formed by CVD at a temperature of 350° C. The thickness of the PSG film 101 corresponds to the gap between the movable member 6 and the heat generating member 2 shown in FIG. 1 and is selected as 1 to 20 μm. This gap has an effect of enhancing the effect of the movable member 6 in the balance of the entire liquid path of the liquid discharge head. Then the PSG film 101 is patterned by applying a resist material (not shown) on the PSG film 101 for example by spin coating, then executing exposure and development in the photolithographic process, and eliminating a portion of the resist where the movable member 6 is to be fixed.

Figure 5G:
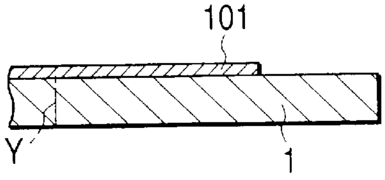

Then the portion of the PSG film 101, not covered by the resist, is removed by wet etching employing buffered hydrofluoric acid. Then the resist remaining on the PSG film 101 is removed by oxygen plasma etching or by immersing the element substrate 1 in a resist remover. Thus, as shown in FIGS. 5B and 5G, a part of the PSG film 101 remains on the surface of the element substrate 1 and constitutes a gap forming member corresponding to the space of the bubble generating area 10. Through these steps, a gap forming member corresponding to the space of the bubble generating area 10 is formed on the element substrate 1.

Figure 5H:
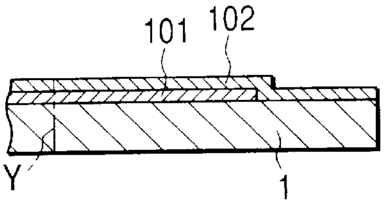

Then, as shown in FIGS. 5C and 5H, a SiN film 102 of a thickness of 1 to 10 μm is formed as a first material layer, on the surface of the element substrate 1 and the PSG film 101, by plasma CVD at 400° C., employing ammonia and silane gas. A part of the SiN film constitutes the movable member 6. $Si_3N_4$ is best for the composition of SiN film 102, but the proportion of N with respect to S can be within a range of 1 to 1.5 in order to obtain the effect of the movable member 6. Such SiN film is commonly employed in the semiconductor process and has alkali resistance, chemical stability and ink resistance. The method for producing the SiN film 102 is not limited as long as the material thereof has a structure and a composition for obtaining the optimum physical properties for the movable member 6, as a part of this film constitutes the movable member 6. For example, the SiN film 102 can be formed, instead of the plasma CVD, by normal pressure CVD, LPCVD, biased ECRCVD, microwave CVD, sputtering or coating. Also the SiN film may have a multi-layered structure with successive changes in the composition, in order to improve the physical properties such as stress, rigidity or Young's modulus, or chemical properties such as alkali resistance or acid resistance. It is also possible to realize a multi-layered structure by successive additions of an impurity or to add an impurity in a single-layered film.

Figure 5I:
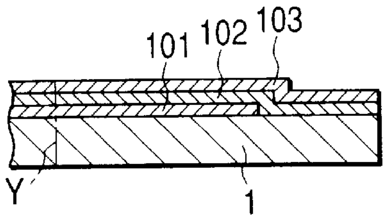

Then, as shown in FIGS. 5D and 5I, an anti-etching protective film 103 is formed on the SiN film 102. As the anti-etching protective film 103, an Al film of a thickness of 2 μm is formed by sputtering. The anti-etching protective film 103 prevents the damage to the SiN film 102 for constituting the movable member 6, in a next etching step for forming the liquid path lateral walls 9. In case the movable member 6 and the lateral walls 9 of the liquid path are formed with approximate similar materials, the movable member 6 is etched at the etching for forming the lateral walls 9. Therefore, in order to prevent damage by etching on the movable member 6, the anti-etching protective film 103 is formed on a face of the SiN film 102 constituting the movable member 6, opposite to the element substrate 1.

Figure 5J:
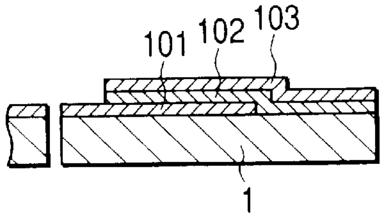

Then, in order to form the SiN film 102 and the anti-etching protective film 103 into a predetermined shape, a resist material is coated on the anti-etching protective film 103 for example by spin coating and photolithographic patterning is executed. Then as shown in FIGS. 5E and 5J, the SiN film 102 and the anti-etching protective film 103 are etched into the shape of the movable member 6 by dry etching for example with $CF_4$ gas or by reactive ion etching. In this manner the movable member 6 is formed on the surface of the element substrate 1. Then the element substrate 1 is cut with a dicing saw into plural units. Though not illustrated, thus divided plural element substrates 1 respectively have the PSG film 101, the SiN film 102 and the anti-etching protective film 103 and are subjected to the succeeding steps to be explained in the following, thereby providing plural liquid discharge heads. In the foregoing description, the anti-etching protective film 103 and the SiN film 102 are patterned at the same time, but it is also possible to at first pattern the protective film 103 alone into the shape of the movable member 6 and then to pattern the SiN film 102 in a later step.

Figure 6A:
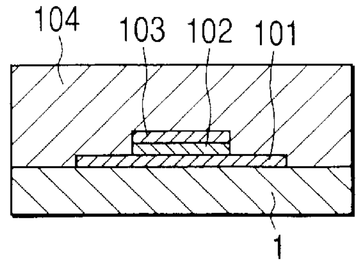
FIGS. 6A, 6B, 6C, 6D, 6E, 6F, 6G, and 6H are views showing steps in a latter part of the producing method shown in FIGS. 5A to 5J.
Figure 6B:
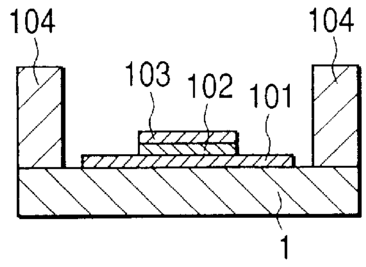
Figure 6C:
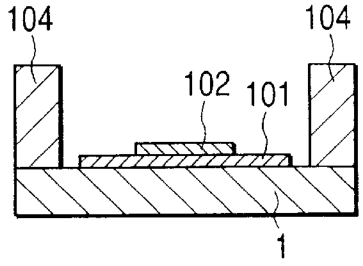
Figure 6D:
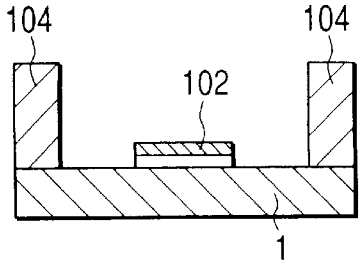
Figure 6E:
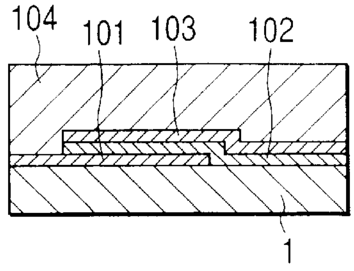

Then, as shown in FIGS. 6A and 6E, a SiN film 104 of a thickness of 20 to 40 μm is formed as a second material layer, on the anti-etching protective film 103, PSG film 101 and element substrate 1. Microwave CVD is employed in case of forming the SiN film 104 promptly. The SiN film 104 eventually constitutes the lateral walls 9 of the liquid path. For the SiN film 104, there are not required the film properties ordinarily required in the semiconductor manufacturing process, such as the pinhole concentration or the film density, but the SiN film 104 is only required to satisfy the ink resistance and the mechanical strength as the lateral walls 9 of the liquid path. The pinhole concentration of the SiN film 104 may become somewhat higher by the fast film formation thereof.

Also, the material of the liquid path lateral walls 9 is not limited to SiN film but can be composed of any film with suitable mechanical strength and ink resistance such as a SiN film containing an impurity or a SiN film with modified composition. It can also be composed of a diamond film, a hydrogenated amorphous carbon film (diamond-like carbon film) or an inorganic film of alumina or zirconia family.

Then, in order to form the SiN film 104 into a predetermined shape, a resist material is coated on the SiN film 104 for example by spin coating and photolithographic patterning is executed. Then the SiN film 104 is formed into the shape of the liquid path lateral walls 9 by dry etching for example with $CF_4$ gas or by reactive ion etching. There may also be employed ICP (induction coupled plasma) etching, most suitable for high-speed etching of the thick SiN film 104. In this manner the lateral walls 9 of the liquid path are formed on the surface of the element substrate 1.

Figure 6F:
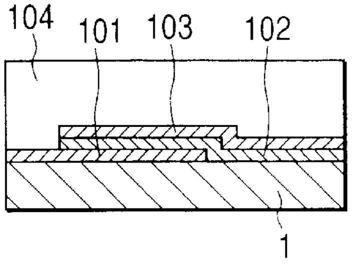

Then, as shown in FIGS. 6B and 6F, after the etching of the SiN film 104 as explained in the foregoing, the resist remaining on the SiN film 104 is removed by oxygen plasma etching or by immersing the element substrate 1 in resist remover.

Figure 6G:
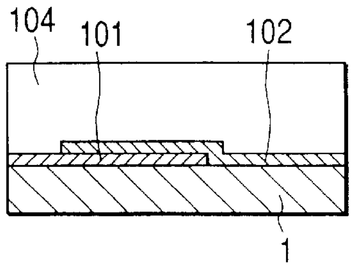

Then, as shown in FIGS. 6C and 6G, the anti-etching protective film 103 on the SiN film 102 is removed by wet etching or by dry etching. In addition to these methods, there may be employed any method capable of removing the anti-etching protective film 103 only. Also the anti-etching protective film 103 need not be removed if it does not detrimentally influence the characteristics of the movable member 6 and is composed of a film of high ink resistance such as a Ta film.

Figure 6H:
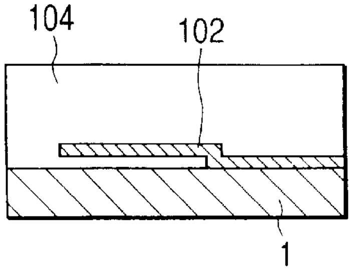

Then, as shown in FIGS. 6D and 6H, the PSG film 101 (gap forming member) 101 under the SiN film 102 is removed with buffered hydrofluoric acid whereby the liquid discharge head of the present embodiment is completed.

In the above-described method for producing the liquid discharge head, the movable member 6 and the lateral walls 9 of the liquid path are directly formed on the element substrate, so that, in comparison with the case of separately preparing and thereafter assembling these components, there can be dispensed with the assembling step and the manufacturing process can be simplified. Also, as the movable member need not be adhered with an adhesive material, the liquid inside the first liquid path 7*a* or the second liquid path 7*b* is not contaminated by such adhesive material. Furthermore, in contrast to the conventional process, it is possible to avoid damaging the surface of the element substrate 1 at the assembling or dust generation at the adhesion of the movable member 6. Furthermore, as the components are formed through semiconductor manufacturing steps such as photolithography or etching, the movable member 6 and the liquid path lateral walls 9 can be formed with a high precision and with a high density.

Second Embodiment

Figure 7A:
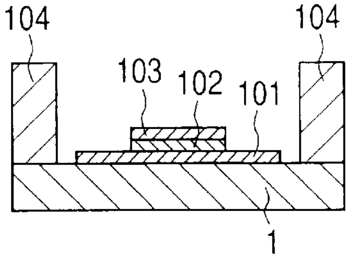
FIGS. 7A, 7B, 7C, 7D, 7E, 7F, 7G and 7H are views showing steps in a second embodiment of the producing method of the present invention for the liquid discharge head.
Figure 7B:
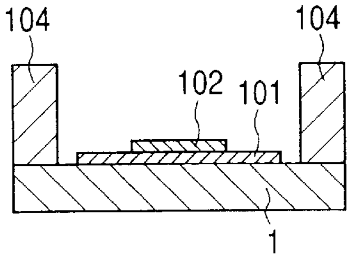
Figure 7C:
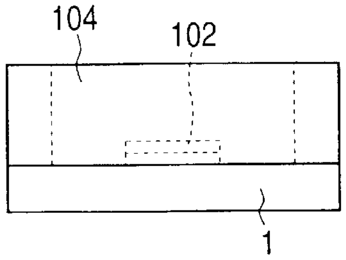
Figure 7D:
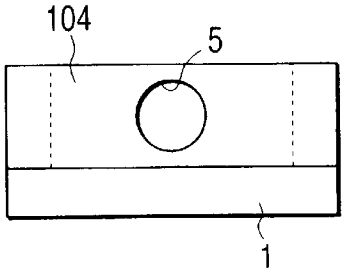

FIGS. 7A to 7H illustrate a second embodiment (variation of first embodiment) of the method for producing the liquid discharge head, explained in the foregoing with reference to FIGS. 5A to 5J and 6A to 6H. In the second embodiment, the orifice plate 4 is formed simultaneously with the formation of the liquid path lateral walls 9 in the producing method explained with reference to FIGS. 5A to 5J and 6A to 6H. In the following there will be explained, with reference to FIGS. 7A to 7H, the producing method for the liquid discharge head in which the lateral walls 9 and the orifice plate 4 are simultaneously formed. FIGS. 7A to 7D successively show the steps of the producing method, in which FIGS. 7A and 7B are cross-sectional views along a direction perpendicular to the extending direction of the liquid paths while FIGS. 7C and 7D are elevation views, and FIGS. 7E to 7H are corresponding cross-sectional views in a direction along the liquid paths.

Figure 7E:
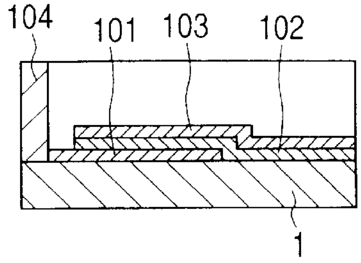

After the formation of the SiN film 104 as shown in FIGS. 6D and 6H, photolithographic patterning and etching are executed so as to leave portions of the SiN film 104, corresponding to the liquid path lateral walls 9 and the orifice plate 4 as shown in FIGS. 7A and 7E. In this manner the orifice plate 4 and the lateral walls 9 of a thickness of 2 to 30 $\mu$m are simultaneously formed on the surface of the element substrate 1.

Figure 7F:
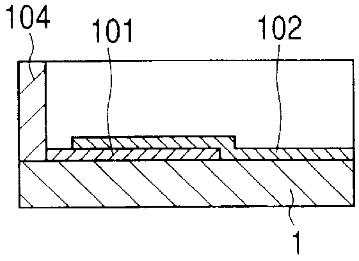

Then, as shown in FIGS. 7B and 7F, the anti-etching protective film 103 on the SiN film 102 is removed by wet etching or dry etching.

Figure 7G:
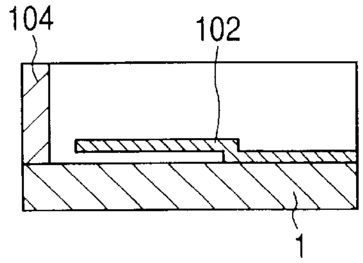

Then, as shown in FIGS. 7C and 7G, the PSG film (gap forming member) 101 under the SiN film 102 is removed with buffered hydrofluoric acid.

Figure 7H:
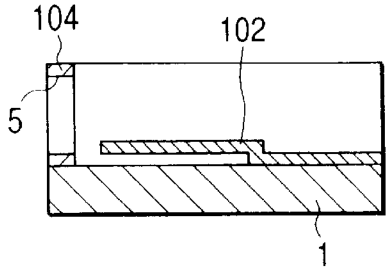
Figure 8A:
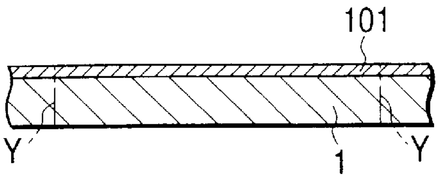
FIGS. 8A, 8B, 8C, 8D, 8E, 8F, 8G, 8H, 8I and 8J are views showing steps in a third embodiment of the producing method of the present invention for the liquid discharge head.
Figure 8B:
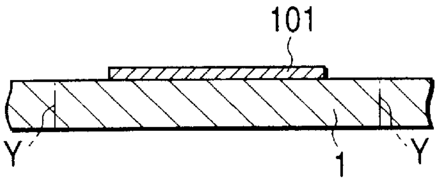
Figure 8C:
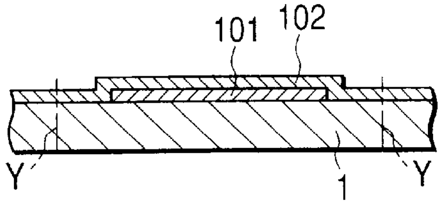
Figure 8D:
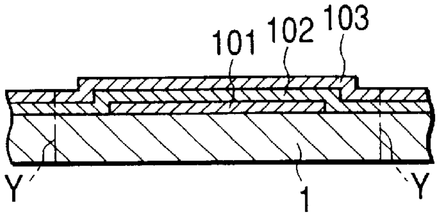
Figure 8E:
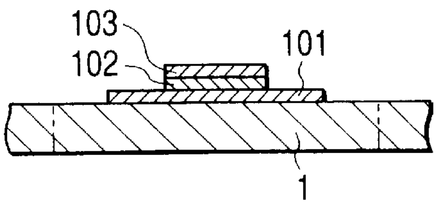
Figure 8F:
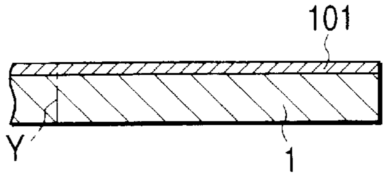
Figure 8G:
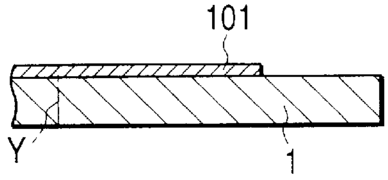
Figure 8H:
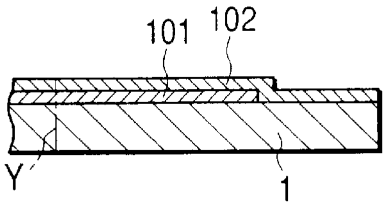
Figure 8I:
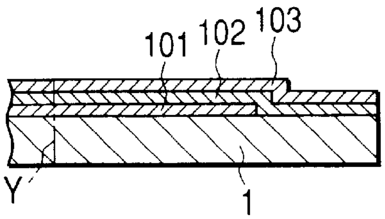
Figure 8J:
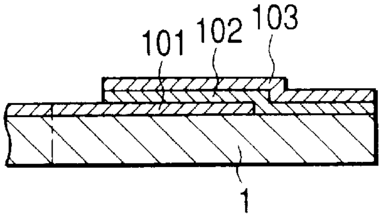
Figure 9A:
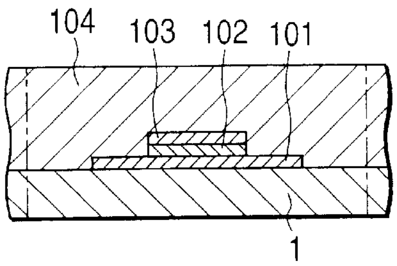
FIGS. 9A, 9B, 9C, 9D, 9E, 9F, 9G and 9H are views showing steps in a latter part of the producing method shown in FIGS. 8A to 8J.
Figure 9E:
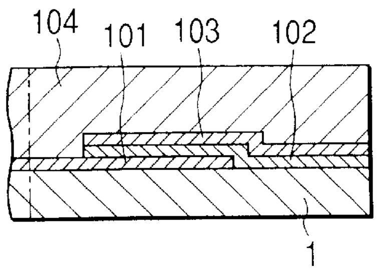
Figure 9B:
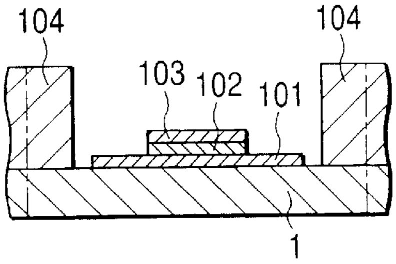
Figure 9F:
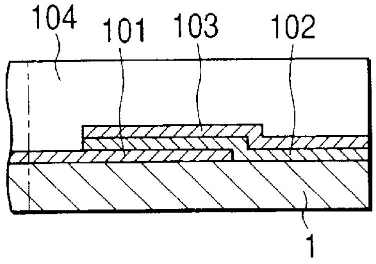
Figure 9C:
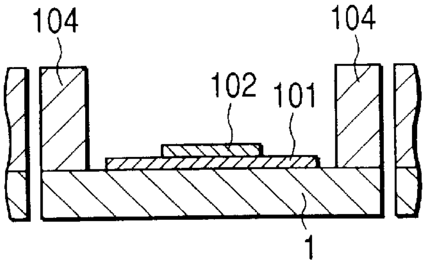
Figure 9G:
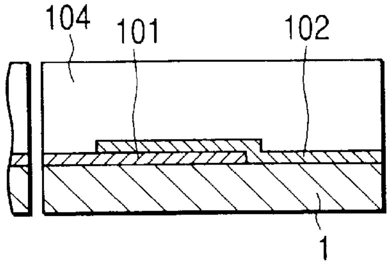
Figure 9D:
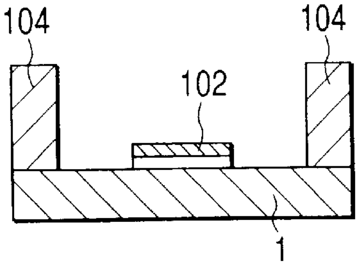
Figure 9H:
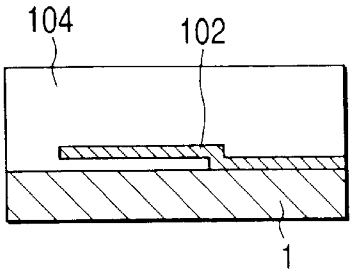
Figure 10A:
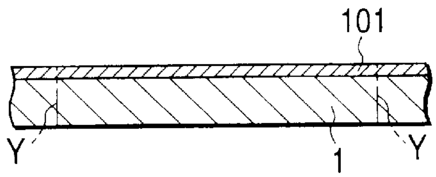
FIGS. 10A, 10B, 10C, 10D, 10E, 10F, 10G, 10H, 10I and 10J are views showing steps in a fourth embodiment of the producing method of the present invention for the liquid discharge head.
Figure 10B:
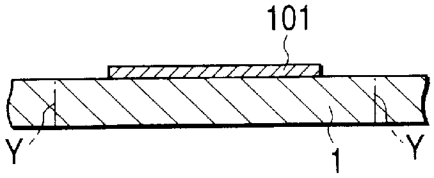
Figure 10C:
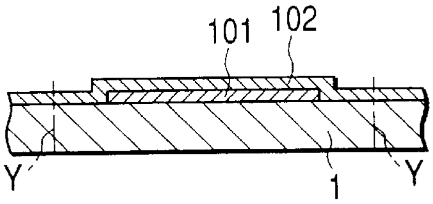
Figure 10D:
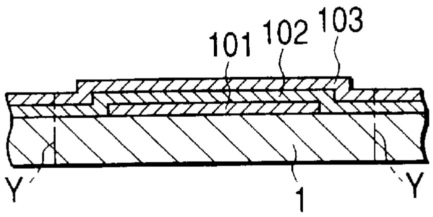
Figure 10E:
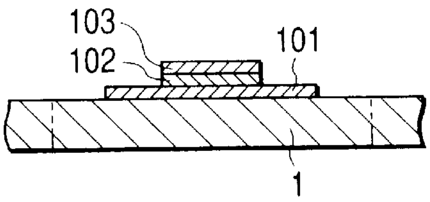
Figure 10F:
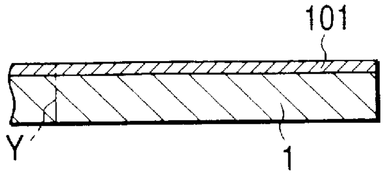
Figure 10G:
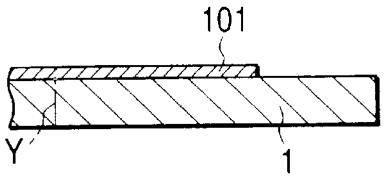
Figure 10H:
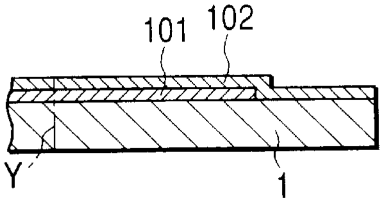
Figure 10I:
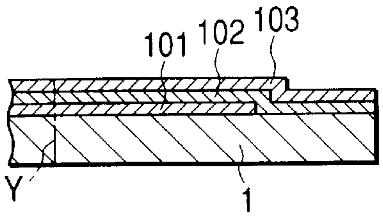
Figure 10J:
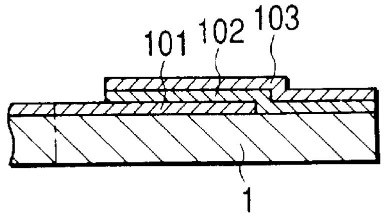
Figure 11A:
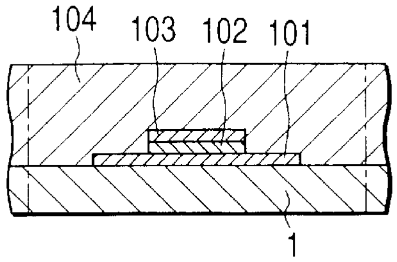
FIGS. 11A, 11B, 11C, 11D, 11E, 11F, 11G, 11H, 11I and 11J are views showing steps in a latter part of the producing method shown in FIGS. 10A to 10J.
Figure 11B:
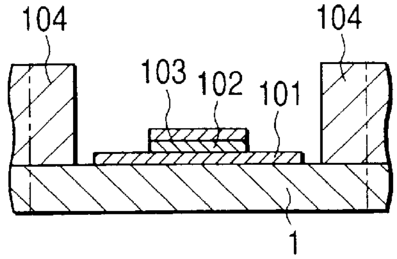
Figure 11C:
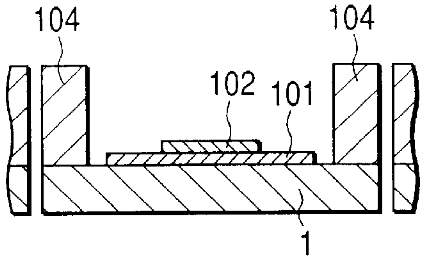
Figure 11D:
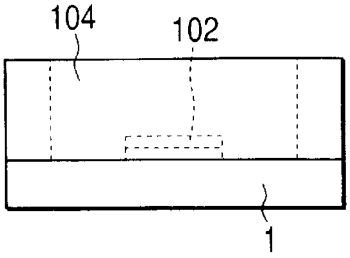
Figure 11E:
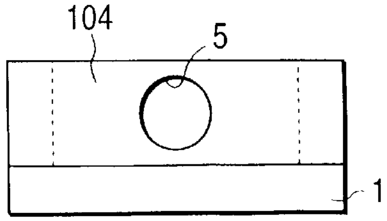
Figure 11F:
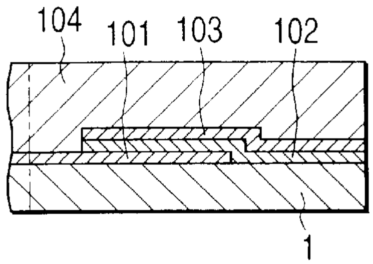
Figure 11G:
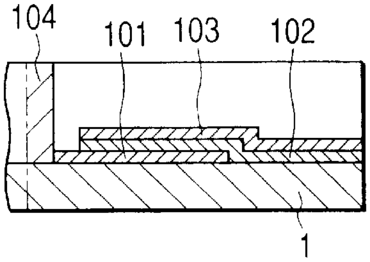
Figure 11H:
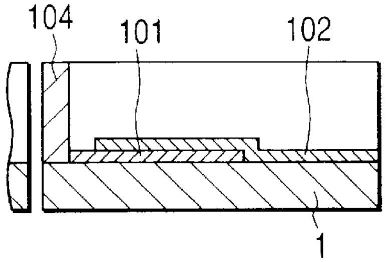
Figure 11I:
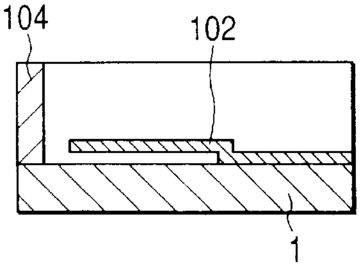
Figure 11J:
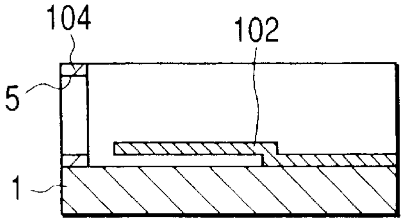
Figure 12A:
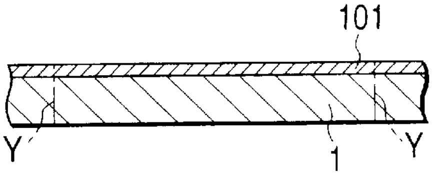
FIGS. 12A, 12B, 12C, 12D, 12E, 12F, 12G, 12H, 12I and 12J are views showing steps in a fifth embodiment of the producing method of the present invention for the liquid discharge head.
Figure 12B:
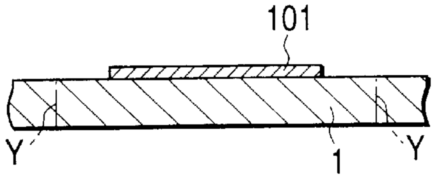
Figure 12C:
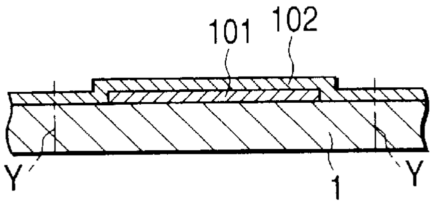
Figure 12D:
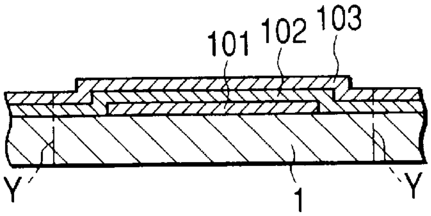
Figure 12E:
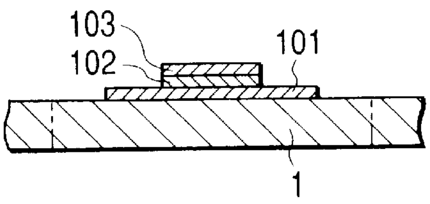
Figure 12F:
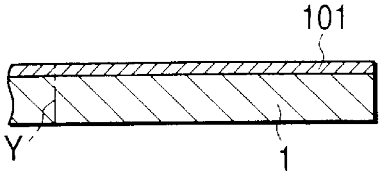
Figure 12G:
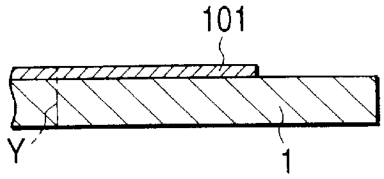
Figure 12H:
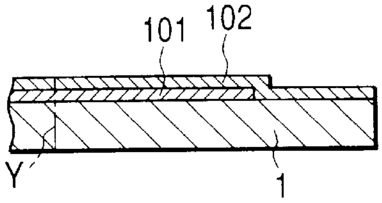
Figure 12I:
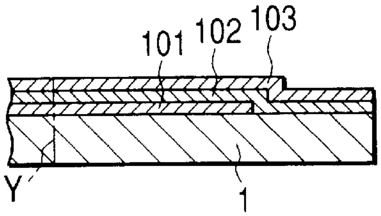
Figure 12J:
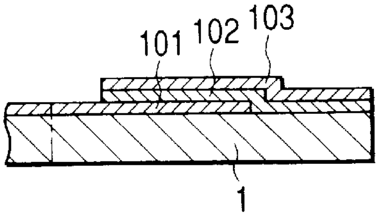
Figure 13A:
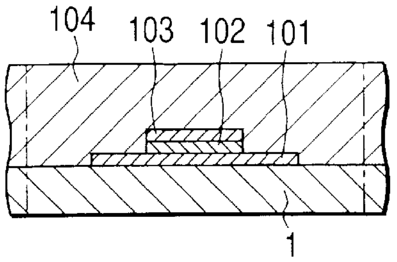
FIGS. 13A, 13B, 13C, 13D, 13E, 13F, 13G, 13H, 13I and 13J are views showing steps in a latter part of the producing method shown in FIGS. 12A to 12J.
Figure 13B:
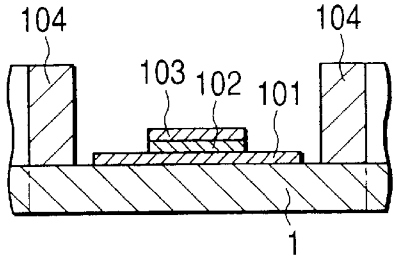
Figure 13C:
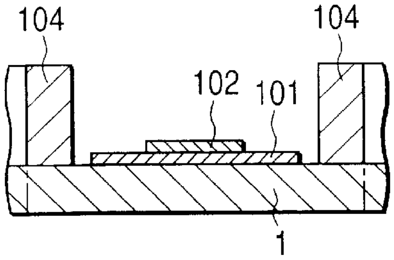
Figure 13D:
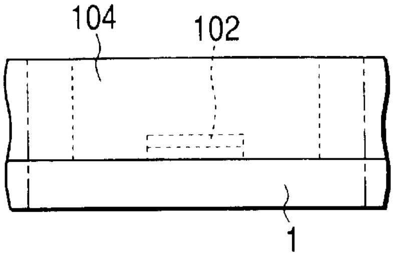
Figure 13E:
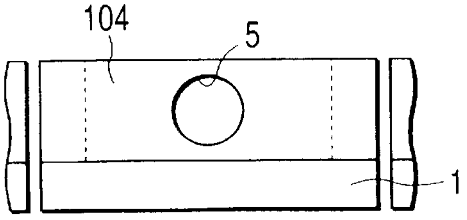
Figure 13F:
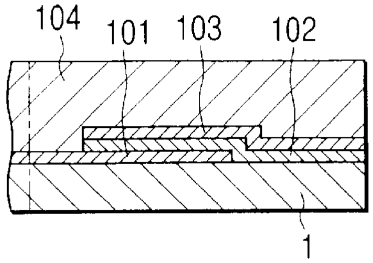
Figure 13G:
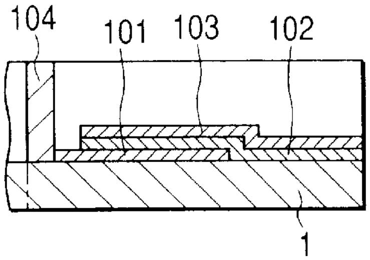
Figure 13H:
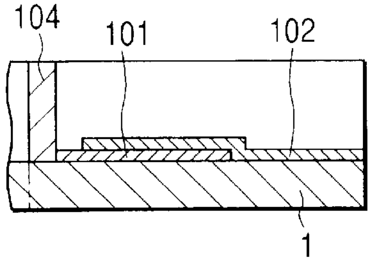
Figure 13I:
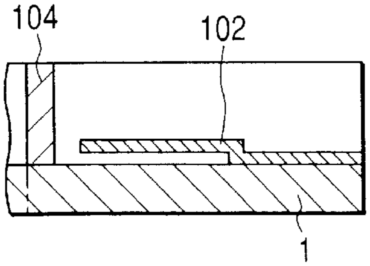
Figure 13J:
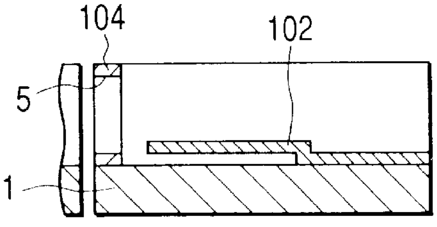

Then, as shown in FIGS. 7D and 7H, the orifice plate 4 is subjected to ablation by irradiation with an excimer laser, thereby forming the discharge opening 5 in the orifice plate 4. In this operation, the molecular bonding of the SiN film 102 is cleaved with a KrF excimer laser having a photon energy of 115 kcal/mol exceeding the dissociation energy 105 kcal/mol of the SiN film 102. The work with the excimer laser, being a non-thermal work, can achieve a high precision without thermal deformation or carbonization around the worked part.

Third Embodiment

FIGS. 8A to 8J and 9A to 9H illustrate a method for producing the liquid discharge head, constituting a third embodiment of the present invention. In contrast to the first embodiment (FIGS. 5A to 5J and 6A to 6H) in which the element substrate 1 is cut after the patterning of the SiN film 102 constituting the movable member 6, in the present embodiment, the element substrate 1 is cut after the liquid path lateral walls 9 and the liquid path are formed by the SiN film 104. In FIGS. 8A to 8J, a broken line indicates a line Y where the cutting is to be made.

Fourth Embodiment

FIGS. 10A to 10J and 11A to 11J illustrate a method for producing the liquid discharge head, constituting a fourth embodiment of the present invention. In the present embodiment, the PSG film 101 under the SiN film 102 is removed after the formation of the orifice plate 4 by the SiN film 104. In FIGS. 10A to 10J, a broken line indicates a line Y where the cutting is to be made.

Fifth Embodiment

FIGS. 12A to 12J and 13A to 13J illustrate a method for producing the liquid discharge head, constituting a fifth embodiment of the present invention. In contrast to the first embodiment (FIGS. 5A to 5J and 6A to 6H) in which the element substrate 1 is cut after the patterning of the SiN film 102 constituting the movable member 6, the element substrate 1 in the present embodiment (FIGS. 12A to 12J and 13A to 13J) is cut after the formation of the orifice plate 4 by the SiN film 104. In FIGS. 12A to 12J, a broken line indicates a line Y where the cutting is to be made.

Also in the foregoing embodiments, the PSG film 101 under the SiN film 102 is removed after the cutting of the element substrate 1, but the removal may be executed in any step after the cutting of the element substrate 1. The removal may also be executed after the adhesion of the ceiling plate 3 or after the mounting of the head, though these steps are not described in the foregoing embodiments. Such methods allow to prevent breakage or deformation of the movable member 6 in various steps, thereby providing the liquid discharge head of high reliability.

Sixth Embodiment

In the following there will be explained a sixth embodiment of the present invention, with reference to the attached drawings.

Figure 16:
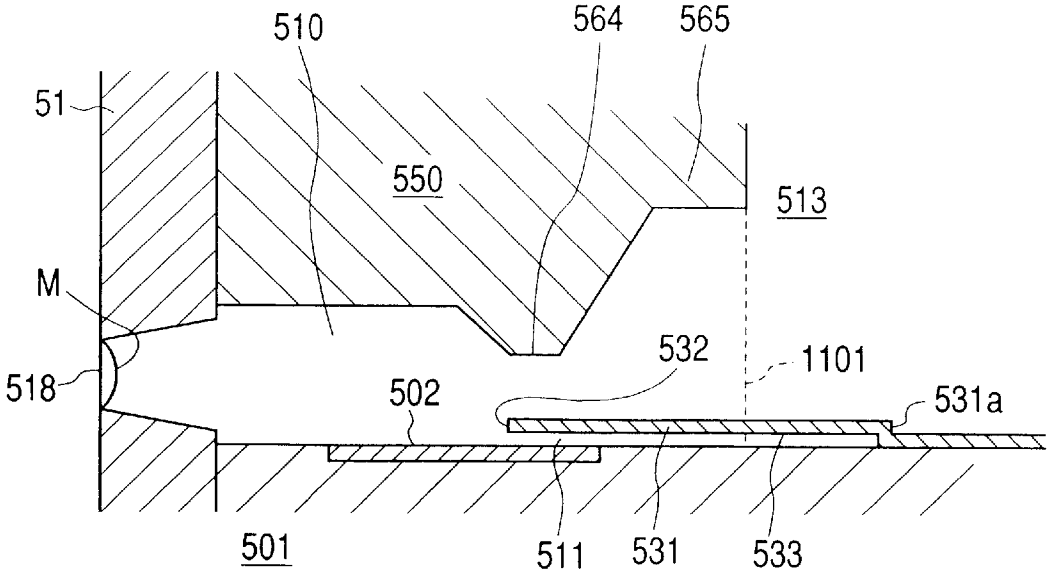
FIG. 16 is a cross-sectional view, along the direction of liquid path, of a liquid discharge head of a sixth embodiment of the present invention.

FIG. 16 is a cross-sectional view, in a direction along the liquid path, of the liquid discharge head of the sixth embodiment of the present invention. In the liquid discharge element shown in FIG. 16, a heat generating member 502, constituting a discharge energy generating element for applying thermal energy to the liquid, is provided in an array of plural units on a smooth element substrate 501, and plural liquid paths 510 are formed on the element substrate 1, respectively corresponding to the heat generating members 502. The neighboring liquid paths 510 are separated by a liquid path partition wall 1101 formed on a ceiling plate 550. Each liquid path 510 communicates with a discharge opening 518 and with a common liquid chamber 513 for liquid supply, and receives, from the common liquid chamber 513, the liquid of an amount corresponding to the liquid discharged from the discharge opening 518. A meniscus M formed by the discharge liquid is maintained in the vicinity of the discharge opening 518, by the balance between the capillary force generated by the internal walls of the discharge opening 518 and the liquid path 10 communicating therewith and the generally negative internal pressure of the common liquid chamber 13.

Each liquid chamber 10 is constituted by adhesion of the element substrate 1 having plural heat generating members 502 and the ceiling plate 550, and a bubble generating area 511 for generating a bubble in the discharge liquid by rapid heating of the heat generating member 502 is present in the vicinity of the interface between the heat generating member 502 and the discharge liquid. In each liquid path 510 having the bubble generating area 511, a movable member 531 is so provided that at least a part thereof is opposed to the heat generating member 502 with a desired distance thereto. The movable members 531 are comb-tooth shaped, each comb tooth extending in the liquid path 510 and having a free end 532 at the downstream side toward the discharge opening 518. The movable member 531 has a step difference portion 531*a* at the upstream side and is supported on the element substrate 501 in a position opposed to the common liquid chamber 513. Particularly in the present embodiment, in order to suppress the growth of the upstream half of the bubble, influencing the backward wave toward the upstream side and the inertial force of the liquid, the free end 532 is positioned at the approximate center of the bubble generating area 511. The movable member 531 is capable of displacement, about a fulcrum 533, together with the growth of the bubble generated in the bubble generating area 511.

Above the center of the bubble generating area 511 in each liquid path 510, there is positioned a stopper (limiting portion) 564 to limit the displacement of the movable member 531 to a certain range, in order to suppress the growth of the upstream half of the bubble. In the liquid path from the common liquid chamber 513 to the discharge opening 518, in an upstream position with respect to the stopper 564, there is formed a low flow resistance area 565 having a lower liquid flow resistance in comparison with that in the liquid path 510. Such low resistance area 565 is so constructed as to lack the upper wall or to have a larger cross section, in order to reduce the resistance of the liquid path to the liquid flow.

In the following there will be explained the producing method for the above-described movable member 531, with reference to FIGS. 17A to 17H and 18A to 18H, which illustrate process steps for producing the movable member on the substrate of the liquid discharge head of the present embodiment. FIGS. 17A to 17H are cross-sectional views in a direction perpendicular to the direction of the liquid path, and FIGS. 18A to 18H are cross-sectional views in a direction along the liquid path. In these drawings, a broken line indicates a line where the cutting is to be made.

Figure 17A:
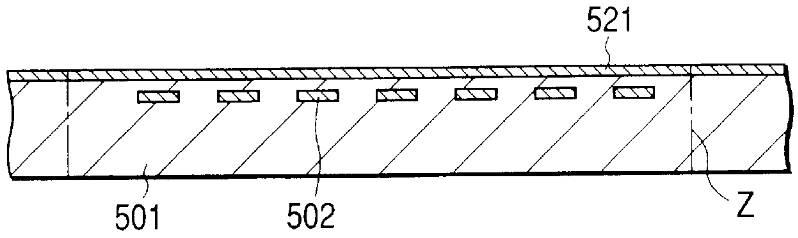
FIGS. 17A, 17B, 17C, 17D, 17E, 17F, 17G and 17H and 18A, 18B, 18C, 18D, 18E, 18F, 18G and 18H are cross-sectional views, in a direction perpendicular to the liquid path, showing steps of forming movable members on the substrate for the liquid discharge head of the sixth embodiment of the present invention.
Figure 18A:
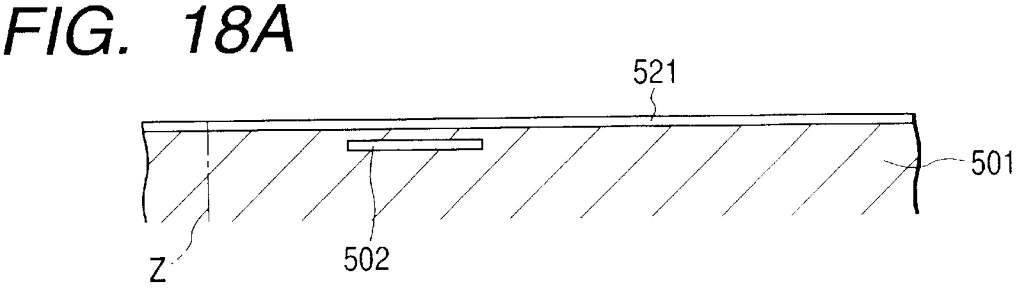

Referring to FIGS. 17A and 18A, on a wafer for example of silicon, bearing plural element substrates 20 on which the heat generating members 502 and driving elements therefor are formed, a TiW film 521 as a protective layer for protecting the electric wiring layer was formed with a thickness of about 2000 Å by sputtering.

Figure 17B:
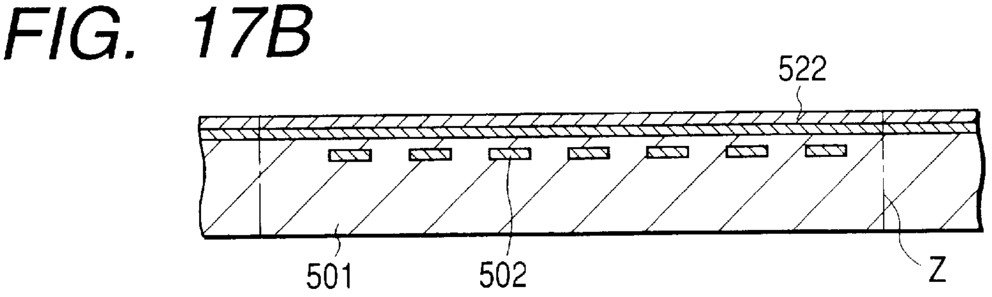
Figure 18B:
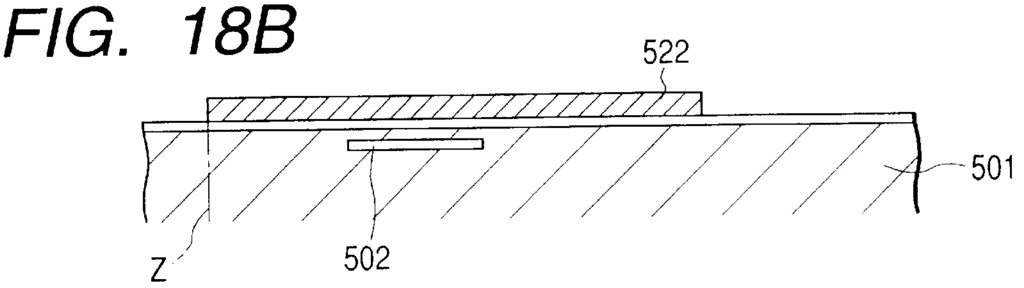

Then, as shown in FIGS. 17B and 18B, as a member for forming the gap (gap forming member) between the heat generating member 502 and the movable member 531, an Al film 522 of a thickness of about 5 μm was formed by sputtering and was patterned by the known photolithographic process. The gap forming member may be composed, instead of aluminum, of an aluminum-containing alloy such as Al—Cu, Al—Ni, Al—Cr, Al—Co or Al—Fe.

Figure 17C:
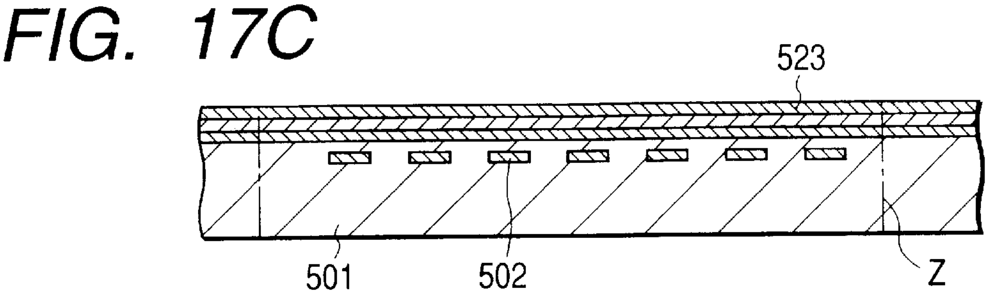
Figure 17D:
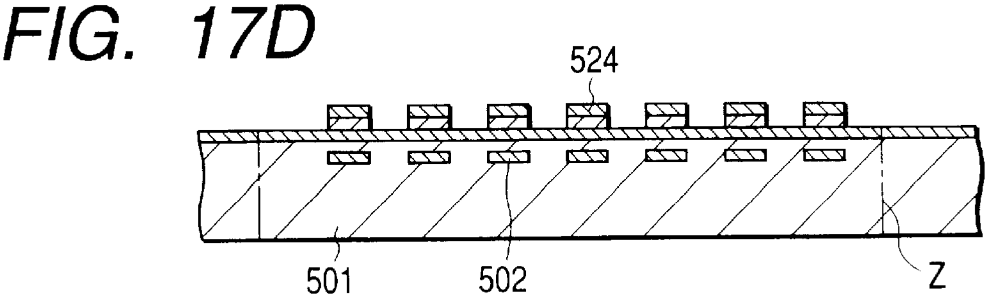
Figure 18C:
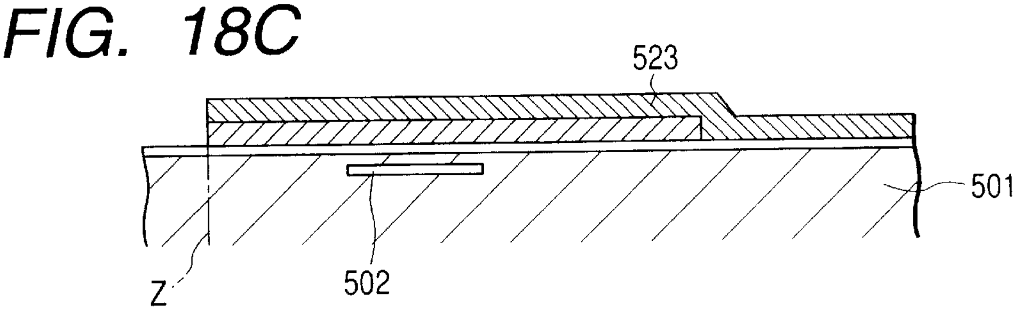
Figure 18D:
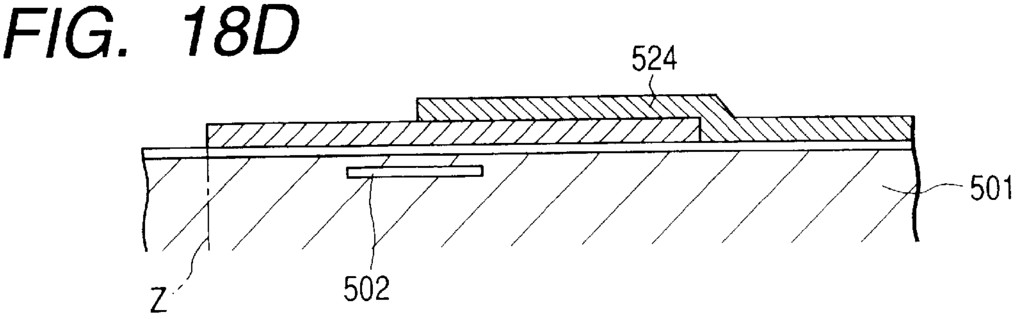

Then, as shown in FIGS. 17C and 18C, a SiN film 523 was formed with a thickness of about 5 μm by plasma CVD and patterned by a photolithographic process to form the movable portions and the step difference portions of the comb-tooth shape. Then etching was conducted, utilizing the Al film 522 as the etching stop layer (cf. FIGS. 17D and 18D).

The SiN film 523 was formed by three successive depositions by plasma CVD. More specifically, after the formation of a SiN film of about 2.0 μm, a $SiO_2$ film of about 1.0 μm was deposited in the reaction chamber of a different CVD apparatus, and the formation of a SiN film of about 2.0 μm was then repeated to obtain the SiN film 523 of about 5 μm in thickness. Such process was employed due to the following reason. The formation of the movable member by a continuous SiN film causes grain growth in the film, leading to the formation of grain boundaries, which deteriorate the durability of the movable member particularly in case such grain boundaries are formed in the fulcrum portion of the movable member. The above-described layered structure, including the $SiO_2$ film of a low Young's modulus, allows to interrupt the grain growth, thus interrupting the grain boundaries. It is thus rendered possible to increase the tolerance for the bending of the movable member resulting from the displacement thereof, thereby improving the strength and durability of the movable member.

Figure 17E:
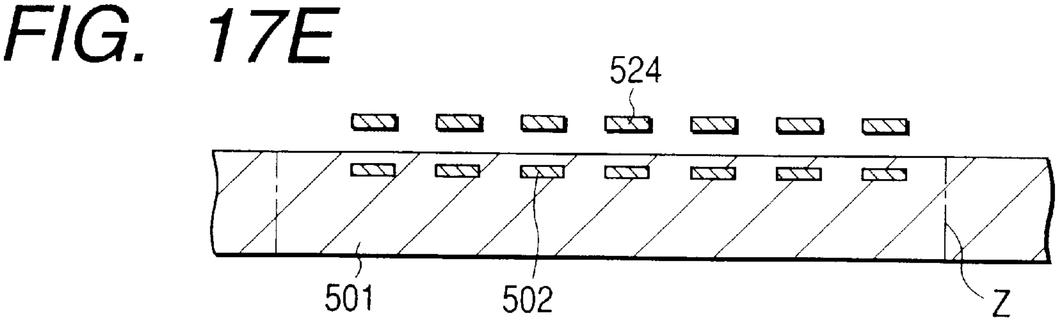
Figure 18E:
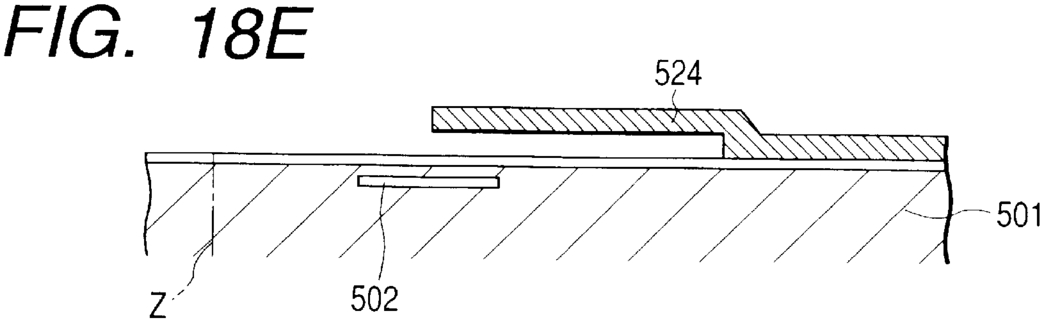

Then, as shown in FIGS. 17E and 18E, the Al film 522 was etched off in warmed state with a mixture of acetic acid, nitric acid and hydrochloric acid. Then the TiW film 521, protecting the wirings, was removed with hydrogen peroxide.

Then wafer is cut with a dicing saw into individual element substrate 501 after the removal of the pad protecting layer (TiW film) and the gap forming member (Al film) between the movable member 531 and the element substrate 501 as explained above, but, prior to such cutting, a filler for filling the gap is coated on the substrate in order to prevent breakage of the movable member 531 by the water pressure at the cutting operation.

In the following there will be explained the details of coating of the gap filler.

Figure 17F:
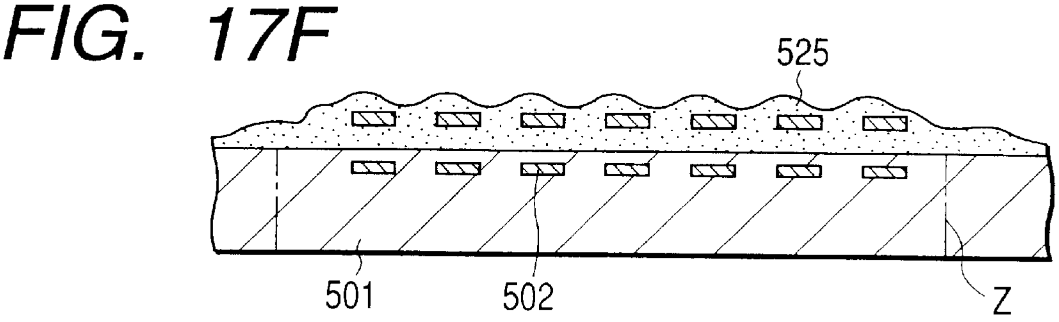
Figure 18F:
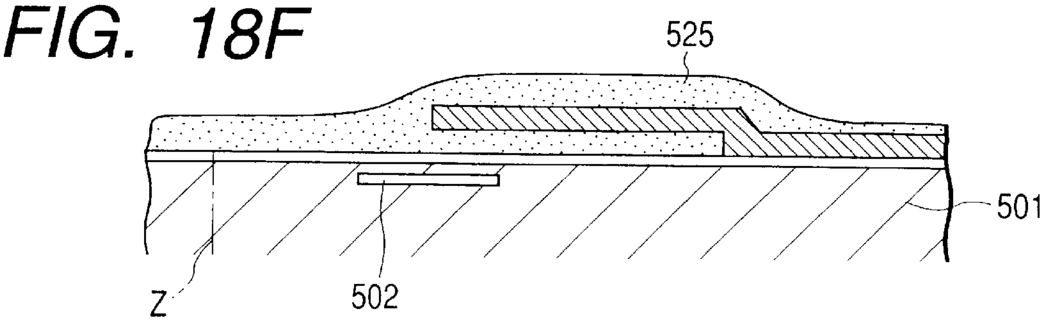

Onto the wafer heated to about 100° C. on a hot plate, wax (for example Alcowax 5402 manufactured by Nikka Seiko Co.) melted in advance is dropped as the gap filler 525 and is uniformly coated by spin coating before the wax is cooled (FIGS. 17F and 18F). More uniform coating can be achieved by employing a spin coater provided with a heating mechanism in the wafer suction unit. Thus the gap between each movable member 524 and the element substrate 501 is filled with the filler 525.

Then the wafer is cooled to the room temperature, and, after confirmation that the coated wax is solidified, the master wafer is adhered to a dicing tape (for example Elep Holder V-8M manufactured by Nitto Denko Co.) as the preparation for the dicing operation, in order to avoid scattering of each divided chip from the wafer.

Figure 17G:
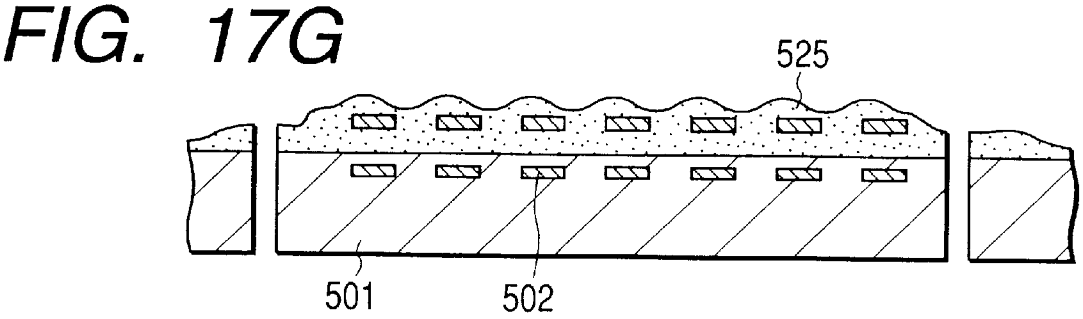
Figure 17H:
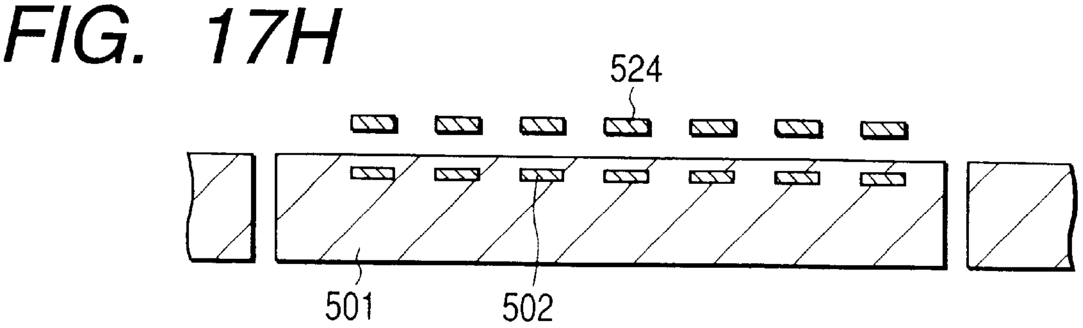
Figure 18G:
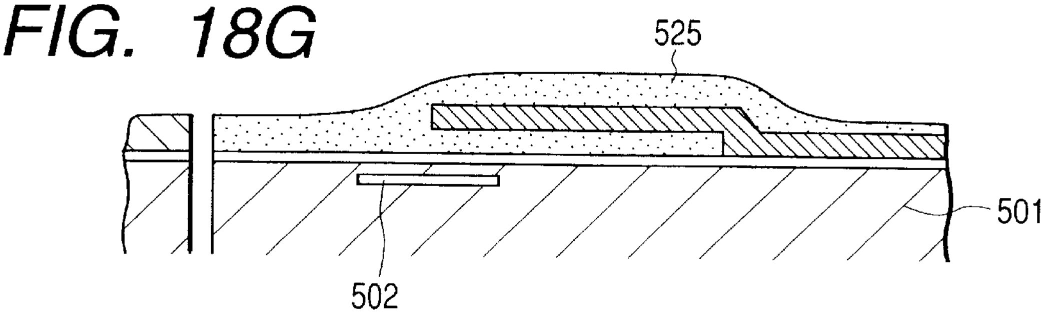
Figure 18H:
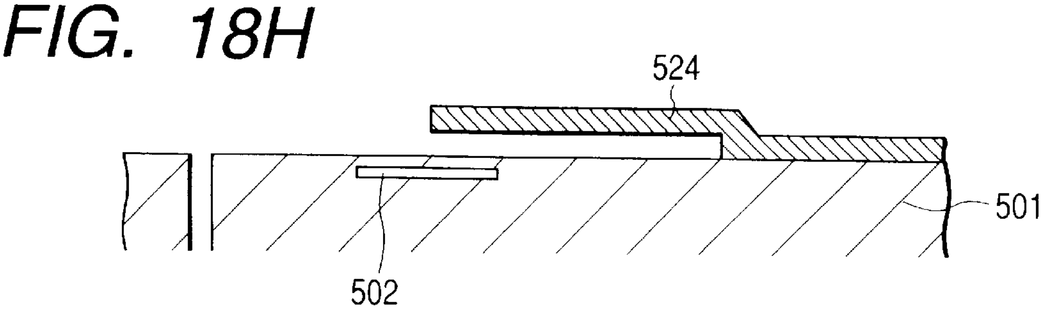

Then, as shown in FIGS. 17G and 18G, the wafer is separated into individual chip constituting each element substrate 502 by a dicing machine (for example Model A-WD-4000 manufactured by Tokyo Seimitsu Co.), and the wax filled in the gap of the movable member 524 is washed off (see FIGS. 17H and 18H). The washing operation for the above-mentioned wax can be achieved with a solvent such as isopropyl alcohol (IPA) or xylene. The chip is then subjected to replacement of the solvent with deionized water and dried.

Instead of the above-described coating method, it is also possible to drop and spin coat a gap filler, consisting of aqueous solution of polyvinyl alcohol (PVA) in water of about 90° C., on the wafer, and, after solidification by drying, to cut the wafer into the individual chip with the dicing machine as explained in the foregoing and to wash off PVA with hot water.

It is also possible to spin coat photoresist (OFR-5 manufactured by Tokyo Oka Kogyo Co.) as the filler, then, after solidification by drying at 50° C., to cut the wafer with the dicing machine and to wash off the filler with isopropyl alcohol, xylene or acetone. Also manicure liquid or paraffin may be used as the filler for spin coating and washed off with xylene or acetone after the chip cutting.

Figure 19:
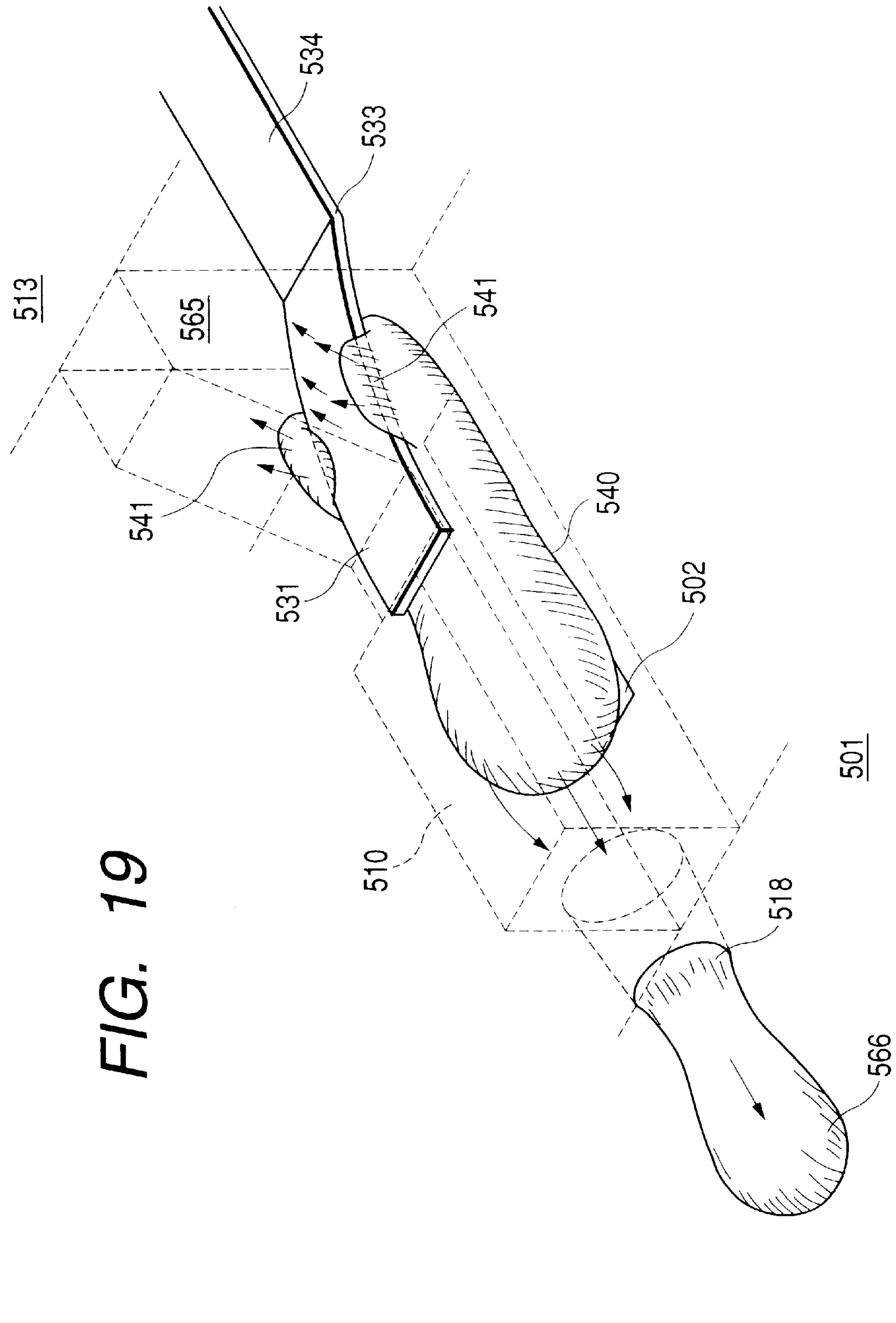
FIGS. 19 and 20 are transmissive perspective views showing the discharge process of the liquid discharge head embodying the present invention.
Figure 20:
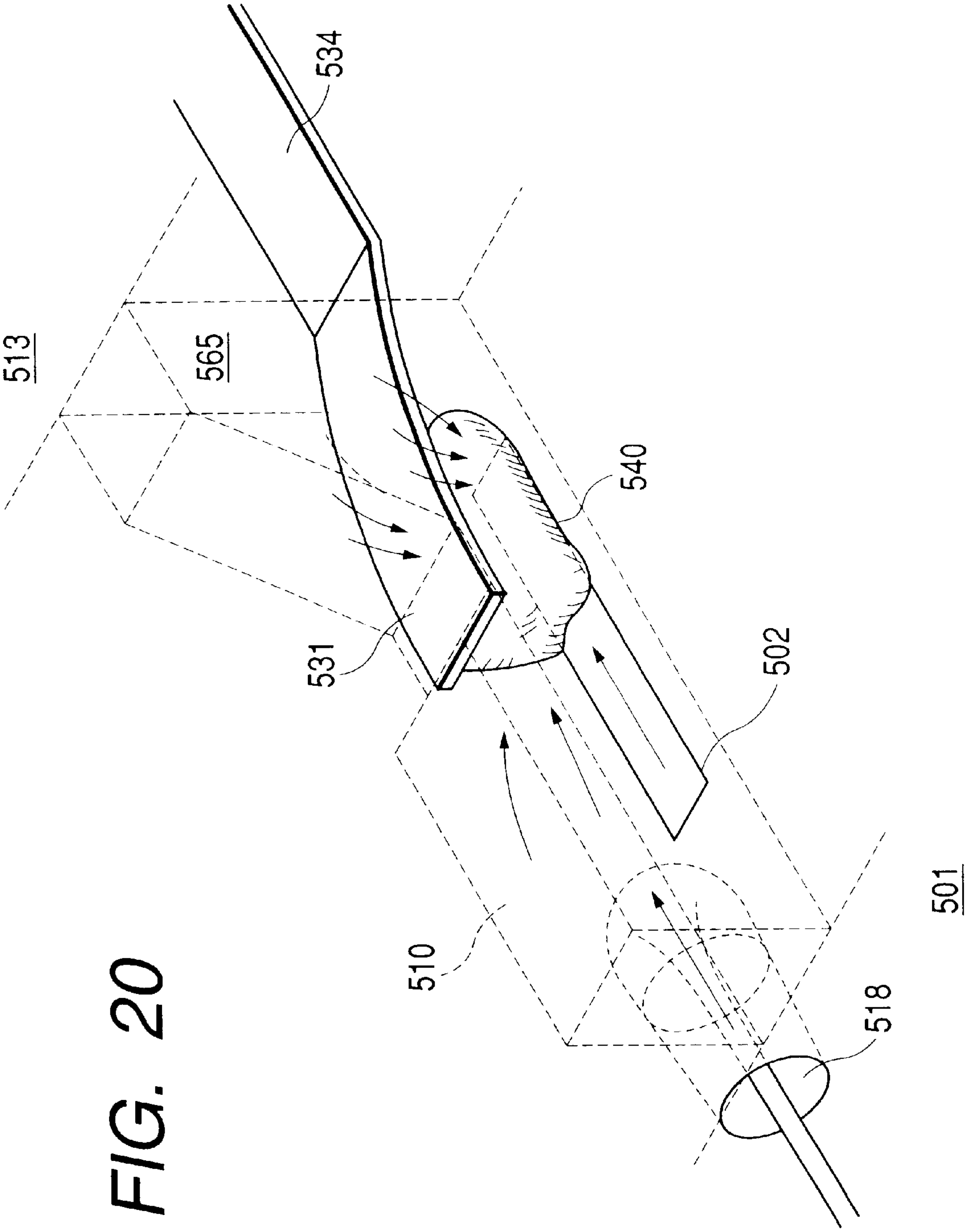
Figure 21A:
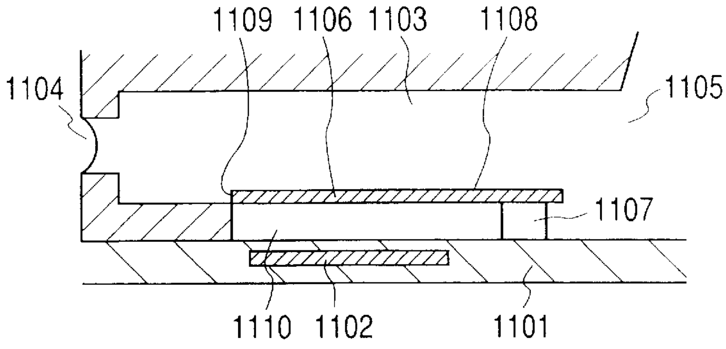
FIGS. 21A, 21B, 21C and 21D are cross-sectional views, in a direction along the liquid path, showing the discharging principle in the conventional liquid discharge head.
Figure 21B:
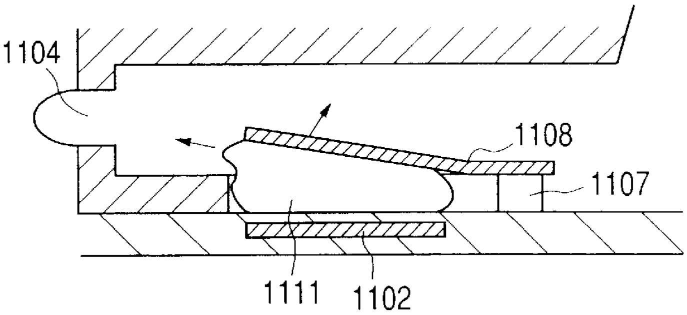
Figure 21C:
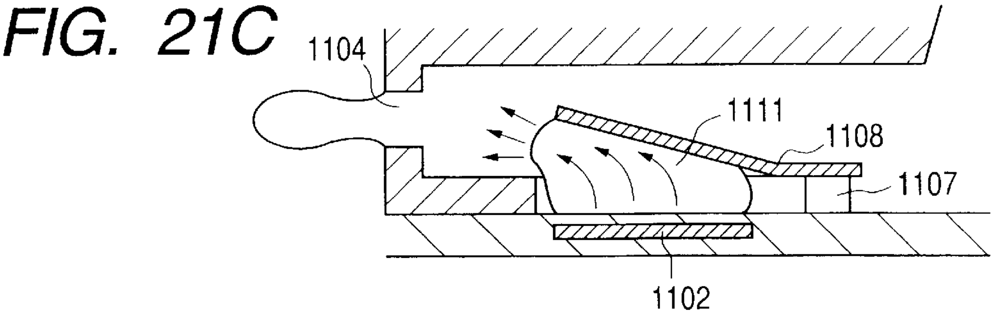
Figure 21D:
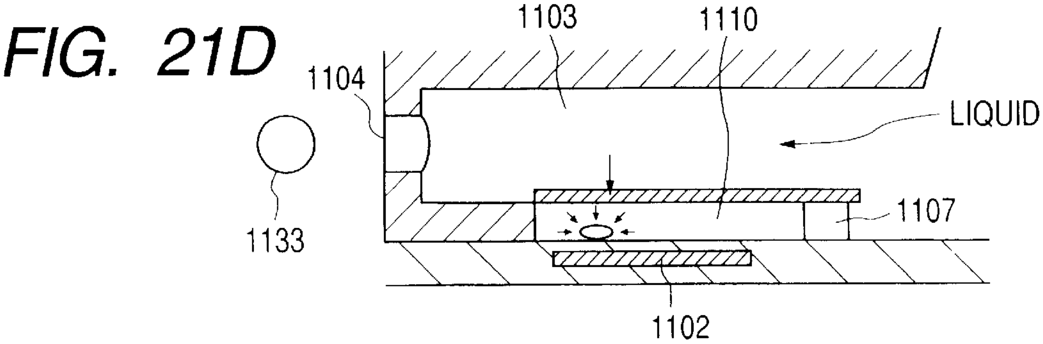
Figure 22:
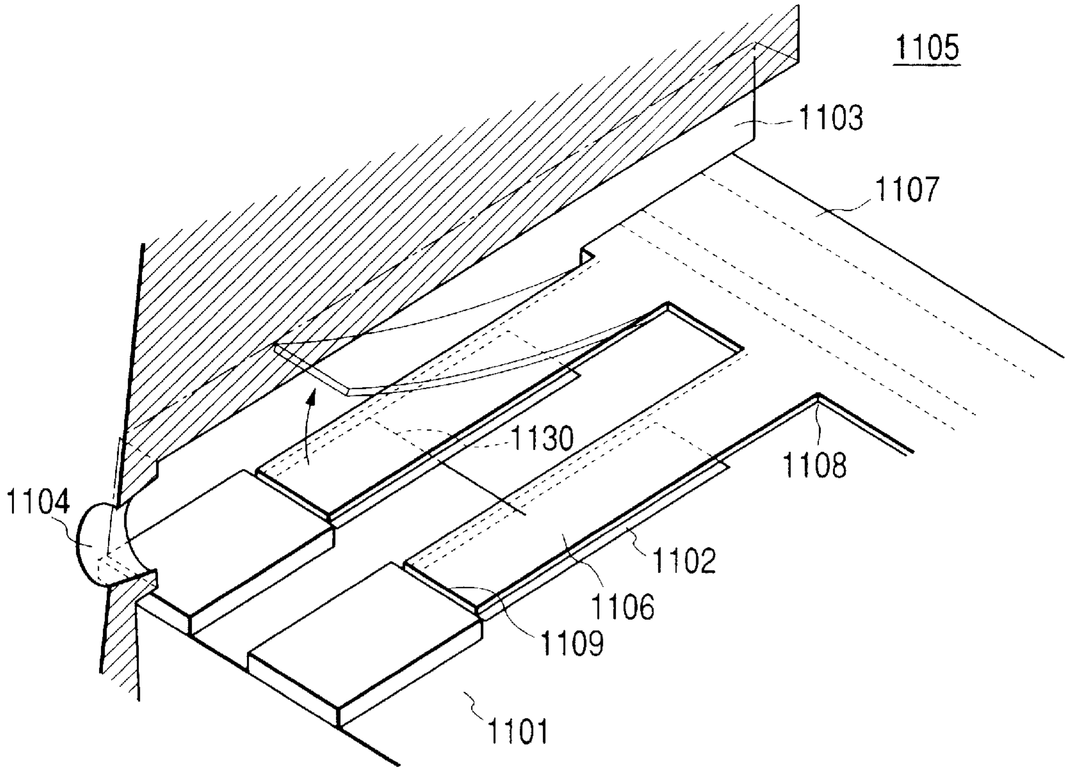
FIG. 22 is a partially broken perspective view of the liquid discharge head shown in FIGS. 21A to 21D.
Figure 23:
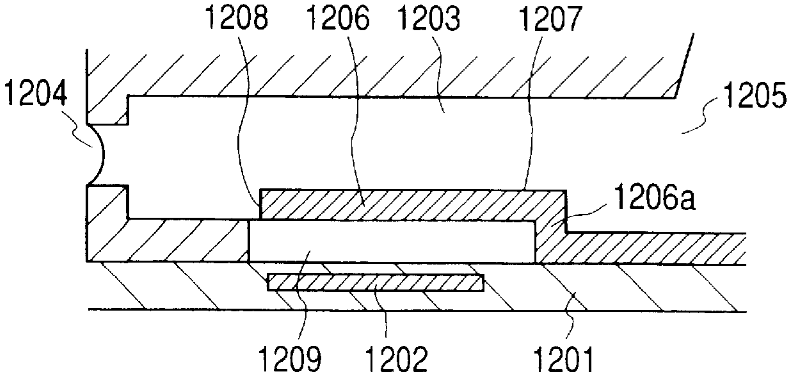
FIG. 23 is a cross-sectional view, in a direction along the liquid path of the liquid discharge head of another conventional configuration.

FIGS. 19 and 20 are transmissive perspective views showing the discharging steps of the head of the present invention.

According to the above-described producing method for the movable member, it is possible to improve the strength of the movable member 531 when it is significantly bent by the bubble generated on the heat generating member 2 in states shown in FIGS. 19 and 20. Also the fulcrum 533 can be given a sufficient strength required when the movable member 531 is bent by a large amount.

Seventh Embodiment

In the foregoing sixth embodiment, the substrate is cut in a state after the formation of the movable member on the substrate. In the present embodiment, after the substrate bearing the movable member and the ceiling plate are adhered to form the liquid path and the common liquid chamber, the adhered member of the substrate and the ceiling plate is cut into individual head.

Figures 24A, 24B, 24C, 24D, 24E, 24F, 24G:
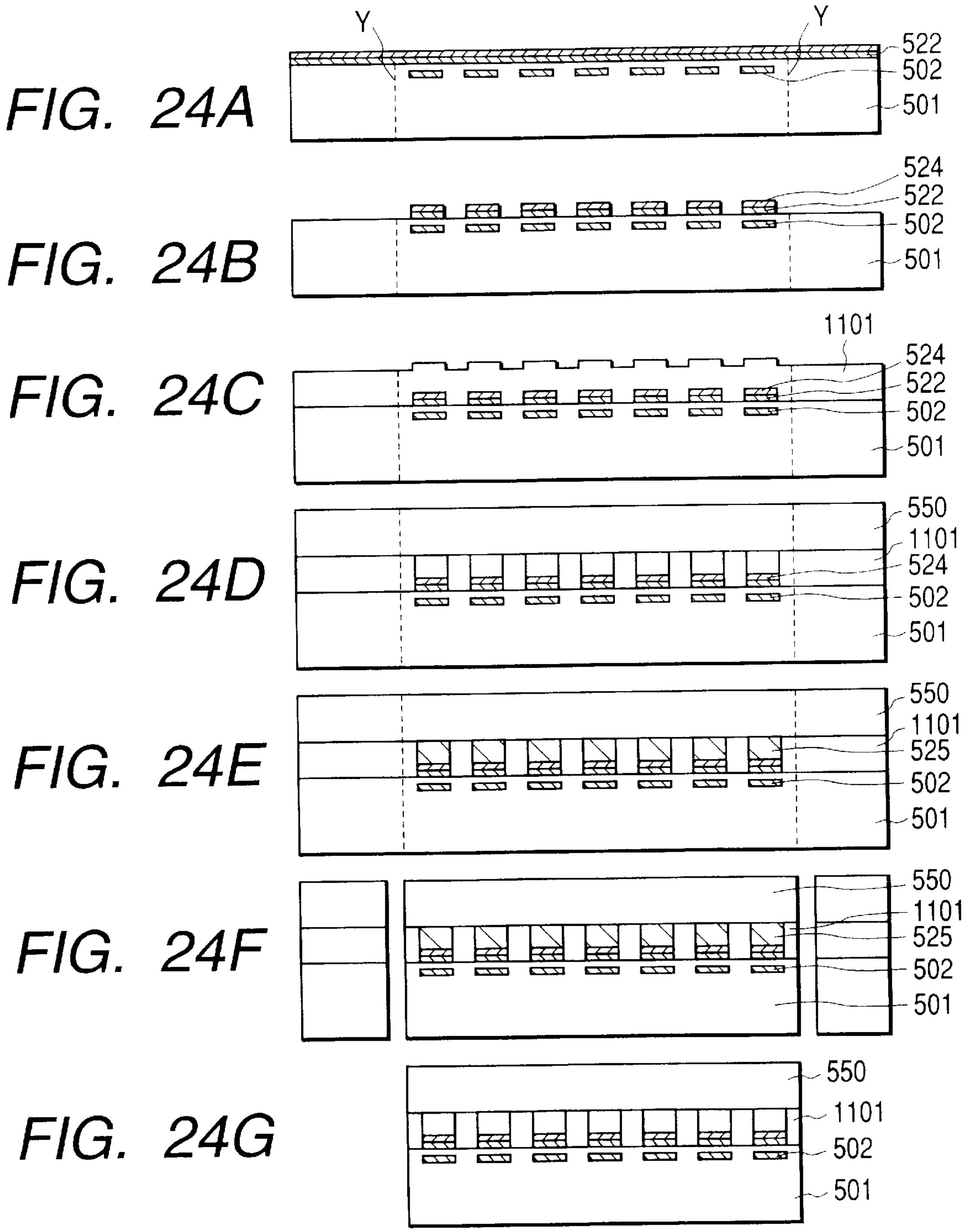
FIGS. 24A, 24B, 24C, 24D, 24E, 24F and 24G are cross-sectional views, in a direction perpendicular to the liquid path, showing steps for forming the liquid discharge head of a seventh embodiment of the present invention.
Figure 25:
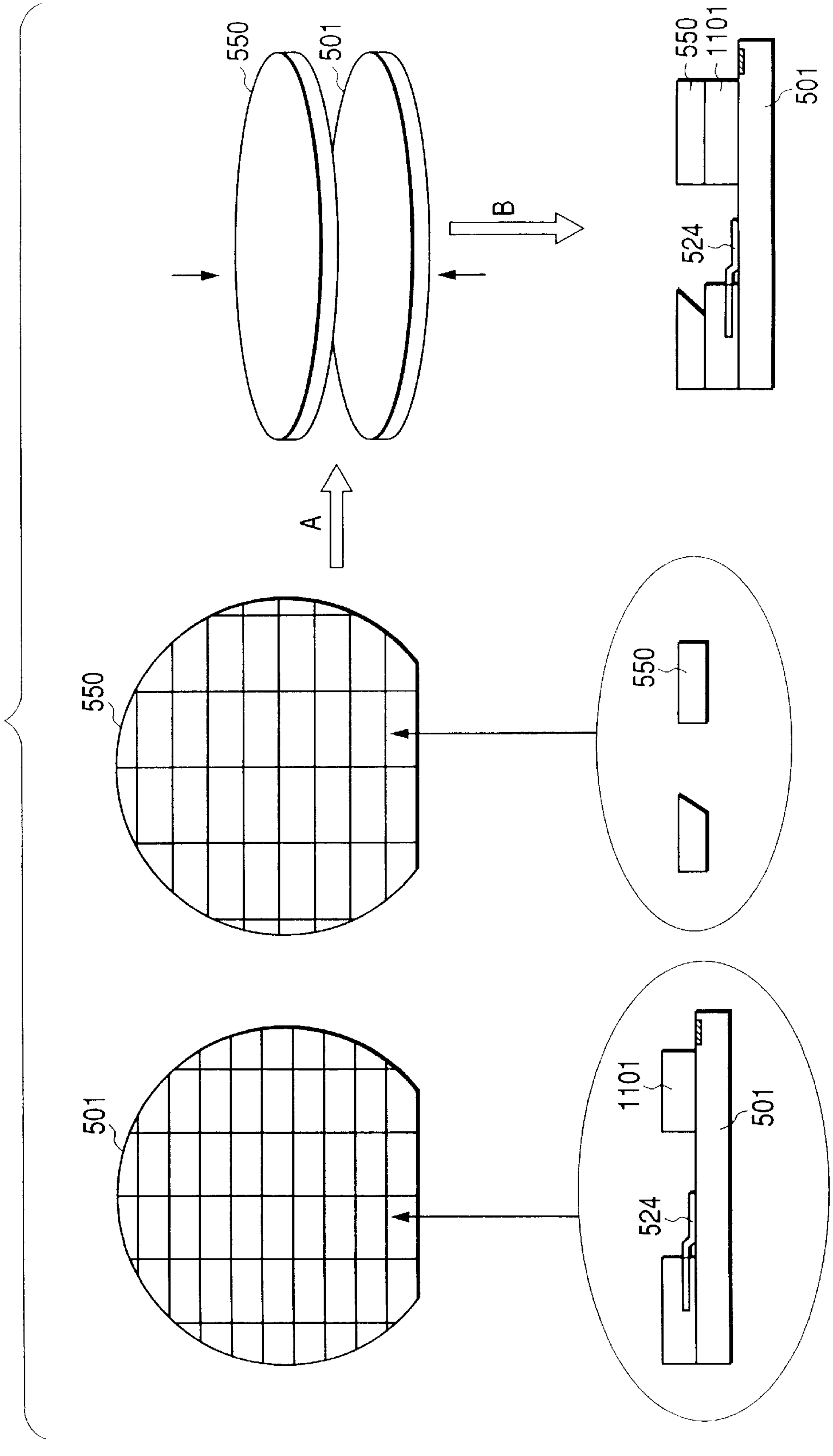
FIG. 25 is a view showing the mode of adhesion of a ceiling plate in the seventh embodiment of the present invention.

FIGS. 24A to 24G are cross-sectional views showing the steps for producing the liquid discharge head of the seventh embodiment, in a direction perpendicular to the liquid path, and FIG. 25 is a view showing the mode of adhesion in the large-sized substrate in the present embodiment. In FIGS. 24A to 24G, a broken line indicates a line Y where the cutting is to be made.

At first, as in the sixth embodiment, a gap forming member 522 is formed on the substrate 501 in order to form the gap between the movable member 524 and the substrate 501 (FIG. 24A). Then a SiN film for forming the movable member is so formed as to cover the gap forming member and patterned to form the movable member 524 (FIG. 24B). Then, a SiN film for forming the liquid path walls is formed on the substrate 501 bearing the movable member 524 (FIG. 24C), and, after surface smoothing, a portion constituting the liquid path is etched off to form the liquid path walls. Subsequently a ceiling plate 550 bearing recesses for forming the ink supply aperture and the liquid chamber is adhered to the substrate 501 bearing the liquid path walls thereon, thus forming the liquid path and the common liquid chamber (FIG. 24D). In this stage in the present embodiment, the substrate 501 and the ceiling plate 550 are in a state of large-sized substrate as shown in FIG. 25, bearing thereon patterns of plural heads, and the adhesion of the substrate 501 and the ceiling plate 550 is conducted by adhesion of two large-sized substrates as shown in FIG. 25 (arrow A). Then, after the filling with filler, the large-sized substrates are cut and separated (FIG. 25 (arrow B)).

After the adhesion of the two large-sized substrate and ceiling plate, and prior to the cutting into the chip size, a resinous material that can be easily washed off is filled, as the gap filler similar to that in the foregoing embodiment, from the ink supply aperture into the liquid path and the common liquid chamber, in order to avoid deformation or breakage of the movable member 524, chipping or cracking in the substrate 501 or in the ceiling plate 550 at the cutting operation and also to prevent intrusion of fine particles generated at the cutting operation into the nozzles (FIG. 24E).

A specific example of such resinous material can be:

(1) a novolac (novolak) resin such as ortho-cresol novolac (manufactured by Sumitomo Chemical Co.);

(2) a phenolic resin such as H-series or HF-series resin (manufactured by Meiwa Kasei Co.); more specifically HF-3 (molecular weight 512 to 562 dissolved in IPA; or (3) $\alpha$-camphor (manufactured by Kanto Chemical Co.).

Such resinous material can be used by dissolving in primary alcohol (for example isopropyl alcohol) with a concentration of 10 to 50 wt. %, filtering for removing dusts etc. and filling into the nozzles and the common liquid chamber.

The filling operation can be made more uniformly and to the fine structure by reducing the pressure inside the nozzles and the common liquid chamber. After filling, heating is executed at 100° C. to 120° C. to evaporate solvent such as IPA, thereby obtaining a completely solidified state.

Then the wafer is adhered to a dicing tape (Elep Holder V-8M manufactured by Nitto Denko Co.), in order to avoid scattering of each divided chip from the wafer at the cutting operation.

Then the wafer is separated into individual chip by a dicing machine (Model A-WD-4000 manufactured by Tokyo Seimitsu Co.) (FIG. 24F).

After separation into the individual head, the filler is removed to complete the head (FIG. 24G). The filler in the fine structure is completedly dissolved and removed with an alcoholic solvent such as IPA, acetone or a mixture thereof, eventually under the application of ultrasonic wave or megasonic wave (800 Hz to 1 MHz).

In case of α-camphor, it is solidified by evaporating IPA under a reduced pressure, and, after cutting, it can be removed by merely heating, without solvent washing, because it is sublimable.

It is also possible to employ a mixture of the materials (1) to (3) as the filler.

Figure 14:
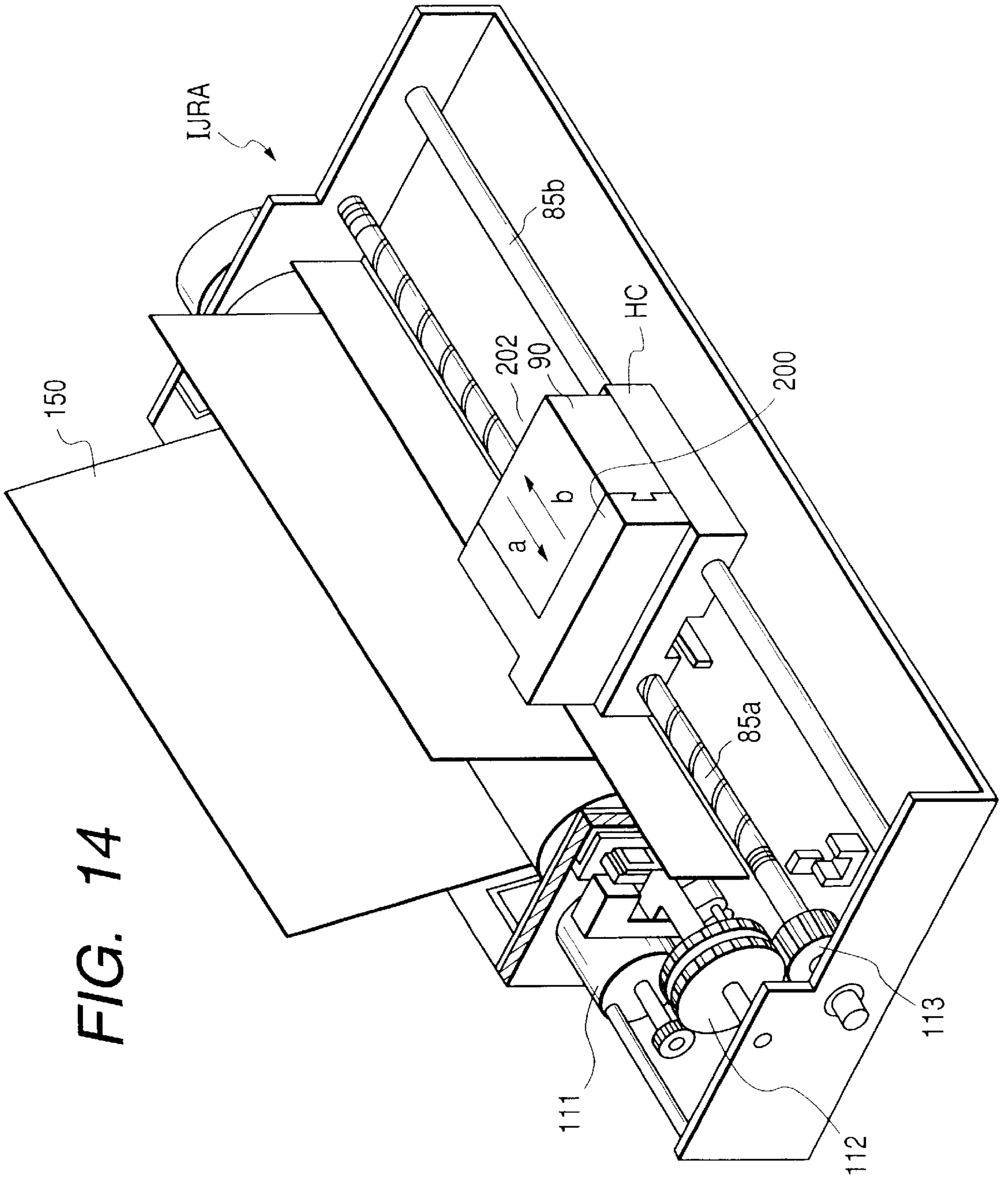
FIG. 14 is a perspective view showing a liquid discharge apparatus in which the liquid discharge head shown in FIG. 1 is mounted.

FIG. 14 is a perspective view of a liquid discharging apparatus in which the above-described liquid discharge head is mounted. In the present embodiment, there will be explained in particular an ink jet recording apparatus IJRA employing ink as the discharge liquid. As shown in FIG. 14, a carriage HC provided in the apparatus IJRA supports a head cartridge in which a liquid container 90 containing ink and a liquid discharge head 200 are detachably mounted. The recording apparatus IJRA is also provided with recording medium conveying means, and the carriage HC reciprocates in the transversal direction (indicated by arrows a, b) of the recording medium 150 such as recording sheet conveyed by the recording medium conveying means. When a drive signal is supplied from an unrepresented drive signal source to the liquid discharge head 200 on the carriage HC in the recording apparatus IJRA, the liquid discharge head 200 discharges ink toward the recording medium 150 in response to such drive signal.

The recording apparatus IJRA is further provided with a motor 111, gears 112, 113 and carriage shafts **85*a*, 85*b* for transmitting the power of the motor 111** to the carriage HC, thereby driving the recording medium conveying means and the carriage HC. Satisfactory recorded images can be obtained by discharging liquid to various recording media by the recording apparatus IJRA.

Figure 15:
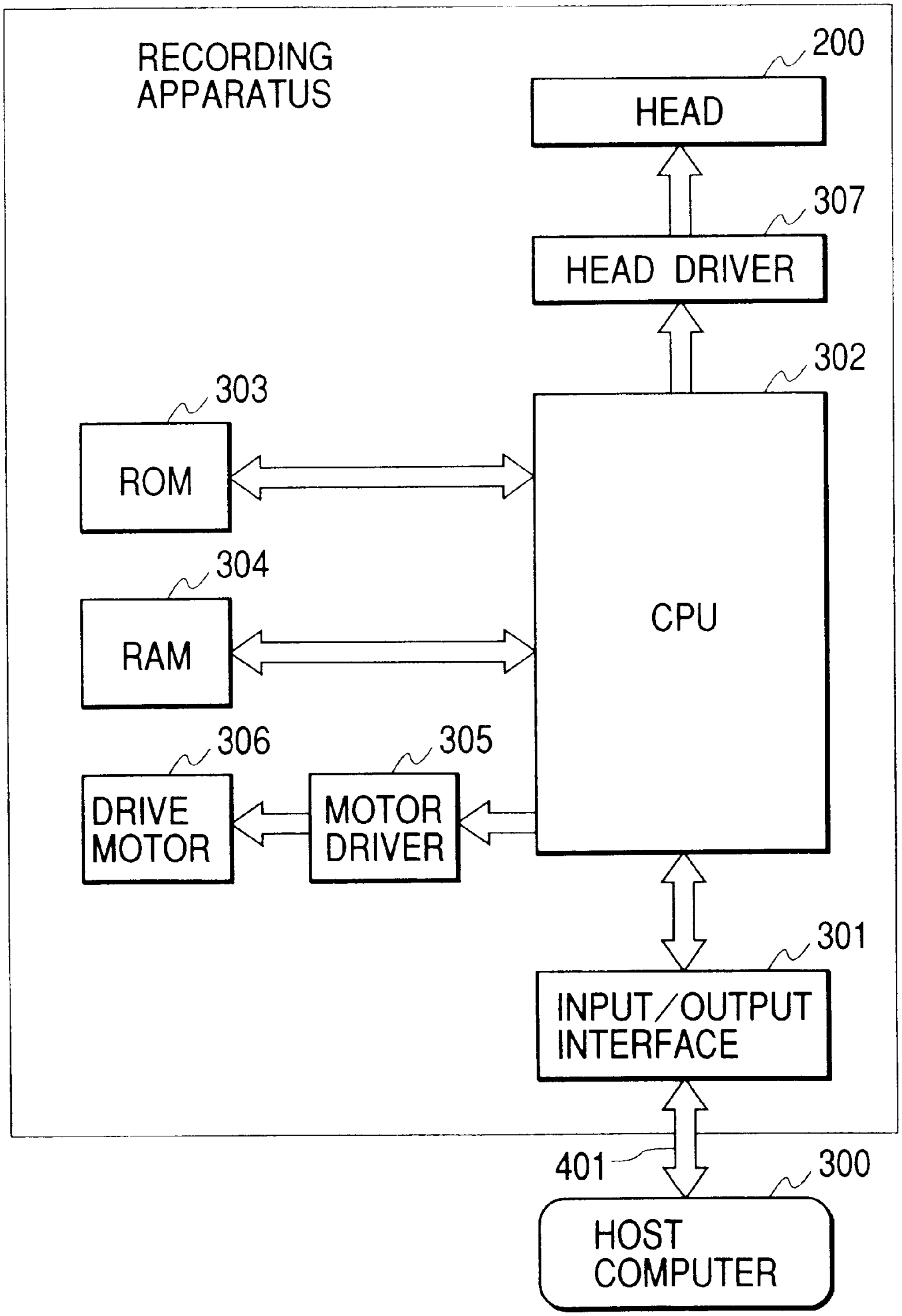
FIG. 15 is a block diagram of the entire ink jet recording apparatus employing the liquid discharge head shown in FIG. 1.

FIG. 15 is a block diagram of the entire apparatus for driving the ink jet recording apparatus employing the liquid discharge head of the present invention.

As shown in FIG. 15, the recording apparatus receives the print information from a host computer 300, as a control signal 401. The print information is temporarily stored in an input/output interface 301 in the recording apparatus, and also converted into data processable in the recording apparatus and entered into a CPU (central processing unit) serving also as drive signal supply means. The CPU 302 processes the data entered thereto, utilizing peripheral units such as a RAM 304 and based on a control program stored in a ROM 303, thereby converting the data into print data (image data).

Also the CPU 302 prepares data for driving a motor 306 for moving recording sheet and the liquid discharge head 200 in synchronization with the image data, in order to record the image data in an appropriate position on the recording sheet. Simultaneous with the transmission of the image data through the head driver 307 to the liquid discharge head 200, the motor driving data are transmitted to the motor 306 through the motor driver 305. Thus the liquid discharge head 200 and the motor 306 are respectively driven at the controlled timing to form an image.

The recording medium applicable to the above-described recording apparatus and subjected to deposition of liquid such as ink can be various papers, an OHP sheet, plastic materials employed in the compact disk or decoration plates, cloth, a metal plate such as of aluminum or copper, cow or pig leather, artificial leather, wood or plywood, bamboo, plastics such as a tile, a three-dimensionally structured material such as sponge etc.

Also the above-described recording apparatus includes a printer for recording on various papers or OHP sheet; a plastics recording apparatus for recording on plastics such as a compact disk; a metal recording apparatus for recording on metal; a leather recording apparatus for recording on leather; a wood recording apparatus for recording on wood; a ceramic recording apparatus for recording on ceramics; a recording apparatus for recording on a three-dimensionally structure material such as sponge; and a dyeing apparatus for recording on cloth.

The discharge liquid to be employed in such liquid discharge apparatus can be designed according to respective recording medium and recording conditions.

As explained in the foregoing, the method of the present invention for producing the liquid discharge head can avoid breakage or damage of the movable member, thereby enabling stable manufacture with an improved yield, since the process is executed in a state in which the gap forming member is formed between the movable member and the element substrate. As the movable member can be formed with a high precision, there are provided advantages of stabilizing the liquid discharging characteristics and providing the liquid discharge head of high reliability. Particularly in a process including a step of cutting the element substrate, there can be obtained an important advantage of avoiding the breakage of the movable member, since the cutting operation is executed while the gap forming member is formed between the movable member and the element substrate.

Also according to the present invention, since the movable member and the liquid path walls are directly formed on the element substrate of the liquid discharge head, in comparison with a case of separately preparing these members and assembling those afterwards, there are obtained advantages of dispensing with the assembling step, thereby simplifying the manufacturing process.

Also in the method of the present invention for producing the liquid discharge head, the movable member, the liquid path walls and the orifice plate can be directly formed on the element substrate through the steps of semiconductor manufacturing process such as photolithography and etching, so that these members can be prepared with a high precision and with a high density. Consequently a liquid discharge head, capable of recording a high definition image, can be produced easily.

What is claimed is:

1. A method for producing a liquid discharge head provided with an element substrate and a ceiling plate which are fixed in a mutually opposed state, plural liquid path walls provided between the ceiling plate and the element substrate and defining plural liquid paths, plural discharge energy generating elements provided in parallel manner on the surface of the element substrate so as to be respectively positioned in the plural liquid paths, and plural movable members provided on the element substrate so as to oppose the plural discharge energy generating elements and formed like cantilevers, fixed at their upstream ends in the flowing direction of the liquid in the liquid paths and having free ends at the downstream ends, the method comprising the steps of:

forming a gap forming member in a position, on the surface provided with the discharge energy generating element of the element substrate, corresponding to a bubble generating area where a bubble is generated in the liquid by a thermal energy generated by the discharge energy generating element;

forming a first material layer to constitute the movable member on the gap forming member;

patterning an anti-etching protective film in the form of the movable member;

forming a second material layer on the substrate to constitute the liquid path walls so as to cover the upper and lateral faces of the patterned anti-etching protective film;

removing a portion of the second material layer by etching, therein forming the liquid path walls and the liquid path;

cutting the element substrate to be plurally separated between the step of patterning the movable member and the step of forming the second material layer, wherein the gap forming member exists between the movable member and the substrate during the cutting; and removing the gap forming member after the formation of the liquid path.

2. A method for producing a liquid discharge head according to claim 1, wherein, in said step of forming the liquid path walls, simultaneous with the formation of the plural liquid path walls on the surface of the element substrate, an orifice plate having plural discharge openings respectively communicating with the plural liquid paths is formed in a position corresponding to the front end face of the plural liquid path walls.

3. A method for producing a liquid discharge head according to claim 1, wherein, in said step of patterning the anti-etching protective film, the first material layer constituting the movable member is patterned simultaneously with the anti-etching protective film.

4. A method for producing a liquid discharge head according to claim 1, wherein the movable member, the plural liquid path walls and the orifice plate are formed with silicon nitride, while the gap forming member is formed with phosphosilicate glass (PSG) and the anti-etching protective film is formed with aluminum.

5. A method for producing a liquid discharge head according to claim 1, wherein the element substrate, the movable member, the liquid path walls, the orifice plate and the ceiling plate contain the same material.

6. A method for producing a liquid discharge head according to claim 5, wherein the element substrate is formed by forming plural discharge energy generating elements on the surface of a silicon substrate, and the movable member, the liquid path walls, the orifice plate and the ceiling plate are formed with silicon nitride.

7. A method for producing a liquid discharge head according to claim 1, further comprising the step of forming, on the surface of the element substrate, plural heater drivers for respectively driving the discharge energy generating elements in a linear array parallel to the direction of array of the discharge energy generating elements in such a manner that the heater drivers respectively correspond to the discharge energy generating elements.

8. A method for producing a liquid discharge head provided with an element substrate and a ceiling plate which are fixed in a mutually opposed state, plural liquid path walls provided between the ceiling plate and the element substrate and defining plural liquid paths, plural discharge energy generating elements provided in parallel manner on the surface of the element substrate so as to be respectively positioned in the plural liquid paths, and plural movable members provided on the element substrate so as to oppose the plural discharge energy generating elements and formed like cantilevers, fixed at their upstream ends in the flowing direction of the liquid in the liquid paths and having free ends at the downstream ends, the method comprising the steps of:

forming a gap forming member in a position, on the surface provided with the discharge energy generating element of the element substrate, corresponding to a bubble generating area where a bubble is generated in the liquid by a thermal energy generated by the discharge energy generating element;

forming a first material layer to constitute the movable member on the gap forming member;

forming an anti-etching protective film in the form of the movable member on the first material layer;

patterning the first material layer therein forming the movable member;

forming a second material layer on the substrate to constitute the liquid path walls so as to cover the upper and lateral faces of the patterned anti-etching protective film;

removing a portion of the second material layer by etching, therein forming the liquid path walls and the liquid path;

removing the gap forming member after the formation of the liquid path; and cutting the element substrate to be plurally separated between the step of forming the movable member and the step of removing the gap forming member, wherein the gap forming member exists between the movable member and the substrate during the cutting.

9. A method for producing a liquid discharge head, the liquid discharge head comprising:

a discharge opening for discharging liquid;

a liquid path communicating with the discharge opening for supply of the liquid thereto;

a substrate provided with a heat generating member for generating a bubble in the liquid in the liquid path; and a movable member supported by and fixed to the substrate in a position opposed to the heat generating member on the substrate with a gap from the substrate and with a free end at the side of the discharge opening;

wherein the free end of the movable member is displaced toward the discharge opening about a fulcrum portion formed in the vicinity of the fixing portion of the movable member on the substrate by a pressure induced by the generation of the bubble, wherein the liquid is discharged from the discharge opening, the method comprising the steps of:

forming a gap forming member on the movable member;

forming the movable member on the gap forming member;

cutting the substrate, wherein the gap forming member exists between the movable member and the substrate during the cutting; and removing the gap forming member.

10. A method for producing a liquid discharge head, the liquid discharge head comprising:

a discharge opening for discharging liquid;

a liquid path communicating with the discharge opening for supply of the liquid thereto;

a substrate provided with a heat generating member for generating a bubble in the liquid in the liquid path; and a movable member supported by and fixed to the substrate in a position opposed to the heat generating member on the substrate with a gap from the substrate and with a free end at the side of the discharge opening;

wherein the free end of the movable member is displaced toward the discharge opening about a fulcrum portion formed in the vicinity of the fixing portion of the movable member on the substrate by a pressure induced by the generation of the bubble, wherein the liquid is discharged from the discharge opening, the method comprising the steps of:

forming a protective layer on the substrate in order to form a plurality of the substrates on a single wafer;

forming a gap forming member on the movable member;

forming a base material for the movable member on the substrate, the protective layer and the gap forming member;

patterning the base material for the movable member therein forming the movable member;

removing the gap forming member;

filling a gap filling material in the gap;

cutting and separating the substrate from the wafer, wherein the gap filling material exists between the movable member and the substrate during the cutting; and removing the gap filling material by washing.

11. A method for producing a liquid discharge head according to claim 10, wherein said step of forming the base material for the movable member includes laminating three or more layers with materials different in their Young's modulus.

12. A method for producing a liquid discharge head according to claim 10, wherein the gap filler is applied by spin coating.

13. A method for producing a liquid discharge head according to claim 12, wherein the gap filler is wax.

14. A method for producing a liquid discharge head according to claim 12, wherein the gap filler is polyvinyl alcohol.

15. A method for producing a liquid discharge head according to claim 12, wherein the gap filler is manicure.

16. A method for producing a liquid discharge head according to claim 12, wherein the gap filler is paraffin.

17. A method for producing a liquid discharge head according to claim 12, wherein the gap filler is a resist material.

18. A method for producing a liquid discharge head according to claim 12, wherein the gap filler is a mixture containing at least two materials selected from the group consisting of wax, polyvinyl alcohol, manicure, paraffin and resist material.

19. A method for producing a liquid discharge head, the liquid discharge head comprising:

a discharge opening for discharging liquid;

a liquid path communicating with the discharge opening for supply of the liquid thereto;

a substrate provided with a heat generating member for generating a bubble in the liquid in the liquid path; and a movable member supported by and fixed to the substrate in a position opposed to the heat generating member on the substrate with a gap from the substrate and with a free end at the side of the discharge opening;

wherein the free end of the movable member is displaced toward the discharge opening about a fulcrum portion formed in the vicinity of the fixing portion of the movable member on the substrate by a pressure induced by the generation of the bubble, wherein the liquid is discharged from the discharge opening, the method comprising the steps of:

forming a protective layer on the substrates on a single wafer the moving member;

cutting the substrate, wherein the gap forming member exists between the movable member and the substrate during the cutting; and removing the gap forming member by washing after the cutting step.

20. A method for producing a liquid discharge head according to claim 19, wherein the cutting of the wafer is executed after forming the protective layer and before removing the gap forming member.

* * * * *

UNITED STATES PATENT AND TRADEMARK OFFICE

CERTIFICATE OF CORRECTION

PATENT NO. : 6,468,437 B1 
DATED : October 22, 2002
INVENTOR(S) : Toshio Kashino et al.

It is certified that error appears in the above-identified patent and that said Letters Patent is hereby corrected as shown below:

Column 25,
Lines 5 and 6, "substrate in order to form a plurality of the substrates on a single wafer" should read -- movable member --.

Column 26,
Lines 27 and 28, "substrates on a single wafer the moving" should read -- movable --.

Signed and Sealed this

Twenty-seventh Day of May, 2003

JAMES E. ROGAN
*Director of the United States Patent and Trademark Office*